US010606091B2

(12) United States Patent
Asai et al.

(10) Patent No.: US 10,606,091 B2
(45) Date of Patent: *Mar. 31, 2020

(54) STEREOSCOPIC DISPLAY DEVICE

(71) Applicant: NLT TECHNOLOGIES, LTD., Kawasaki, Kanagawa (JP)

(72) Inventors: Takuya Asai, Kanagawa (JP); Koji Shigemura, Kanagawa (JP)

(73) Assignee: TIANMA MICROELECTRONICS CO., LTD., Shenzhen (CN)

(*) Notice: Subject to any disclaimer, the term of this patent is extended or adjusted under 35 U.S.C. 154(b) by 756 days.

This patent is subject to a terminal disclaimer.

(21) Appl. No.: 14/976,679

(22) Filed: Dec. 21, 2015

(65) Prior Publication Data

US 2016/0182898 A1  Jun. 23, 2016

(30) Foreign Application Priority Data

Dec. 22, 2014 (JP) ................................ 2014-258568
Oct. 13, 2015 (JP) ................................ 2015-202118

(51) Int. Cl.
G02F 1/1343 (2006.01)
G02F 1/1335 (2006.01)
G02B 27/22 (2018.01)

(52) U.S. Cl.
CPC ... *G02B 27/2214* (2013.01); *H04N 2213/001* (2013.01)

(58) Field of Classification Search
USPC ........................................................ 349/146
See application file for complete search history.

(56) References Cited

U.S. PATENT DOCUMENTS 5,953,148 A * 9/1999 Moseley ............ G02B 27/2214
                                                       359/237
8,766,882 B2    7/2014 Fukushima et al.
(Continued)

FOREIGN PATENT DOCUMENTS

CN    101653012 A    2/2010
JP    10-186294 A    7/1998
(Continued)

OTHER PUBLICATIONS

Communication dated Aug. 21, 2018 issued by the Intellectual Property Office of People's Republic of China in counterpart application No. 201510971733.4.
(Continued)

*Primary Examiner* — Edward J Glick
*Assistant Examiner* — Anthony G Quash
(74) *Attorney, Agent, or Firm* — Sughrue Mion, PLLC

(57) ABSTRACT

To provide a naked-eye type stereoscopic display device which can achieve a fine stereoscopic display property while achieving high-definition display and high yield. Aperture parts of sub-pixels neighboring to a first direction include overlapping regions which overlap in a second direction and a non-overlapping region which does not overlap. Provided that a width of the aperture part in the second direction is defined as a longitudinal aperture width, the non-overlapping region includes an aperture width fluctuating region where the longitudinal aperture width changes continuously from roughly a center of the aperture part towards both ends of the first direction, respectively. The sum of the longitudinal aperture widths of the two overlapping regions overlapping with each other at a same position in the first direction is larger than the longitudinal aperture width in roughly the center of the aperture part.

7 Claims, 26 Drawing Sheets

(56) References Cited

U.S. PATENT DOCUMENTS

| | | |
|---|---|---|
| 2008/0079662 A1 | 4/2008 | Saishu et al. |
| 2012/0113100 A1* | 5/2012 | Niioka ............... G02B 27/2214 |
| | | 345/419 |
| 2012/0268481 A1* | 10/2012 | Niioka ................. H04N 13/317 |
| | | 345/619 |
| 2013/0314512 A1 | 11/2013 | Watanabe et al. |
| 2014/0098308 A1 | 4/2014 | Wu et al. |
| 2014/0240827 A1 | 8/2014 | Asai et al. |

FOREIGN PATENT DOCUMENTS

| | | |
|---|---|---|
| JP | 2008-249887 A | 10/2008 |
| JP | 2012-63556 A | 3/2012 |
| JP | 2014-194524 A | 10/2014 |

OTHER PUBLICATIONS

Communication dated Aug. 6, 2019, from the Japanese Patent Office in counterpart Application No. 2015-202118.

* cited by examiner

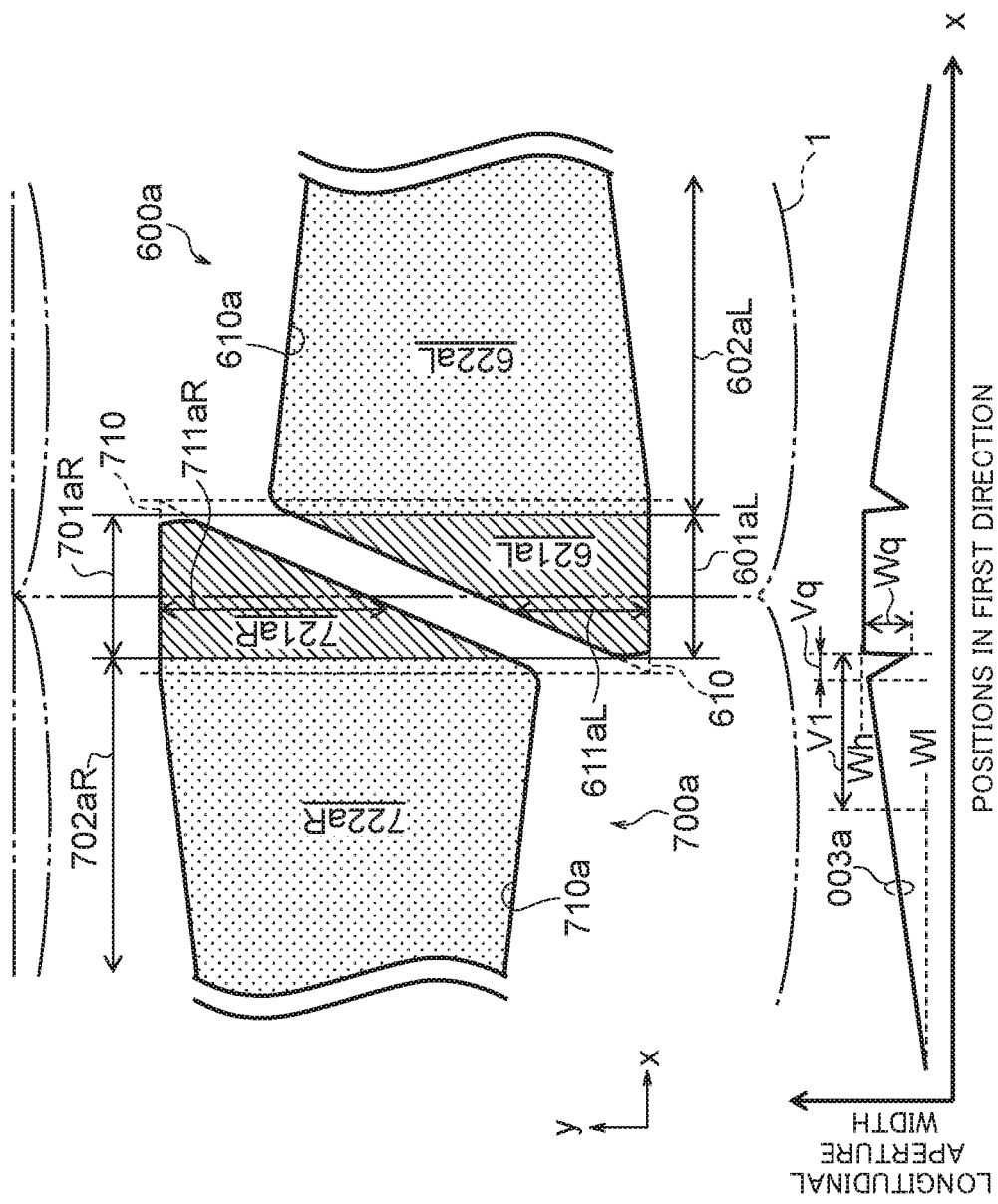

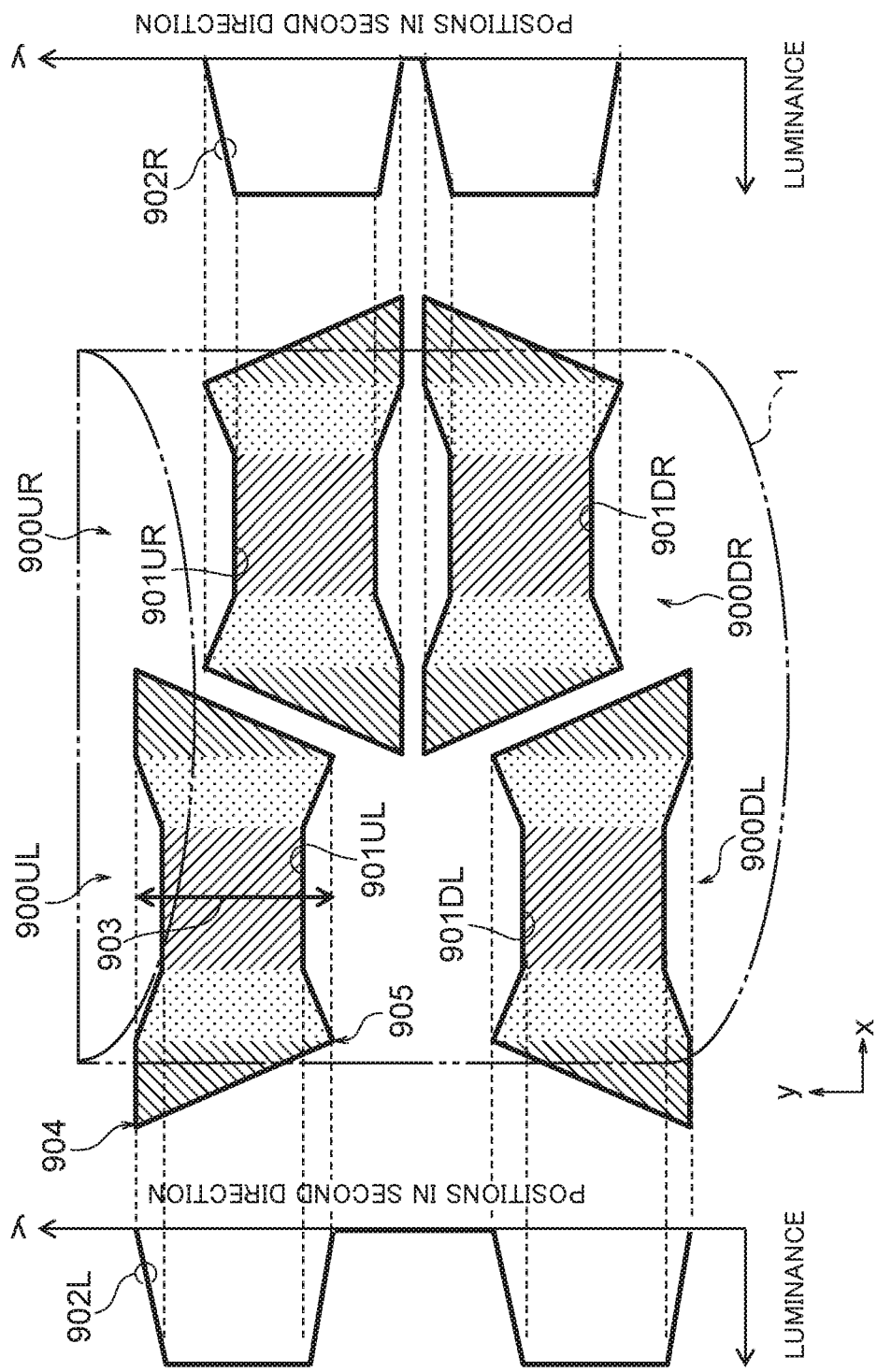

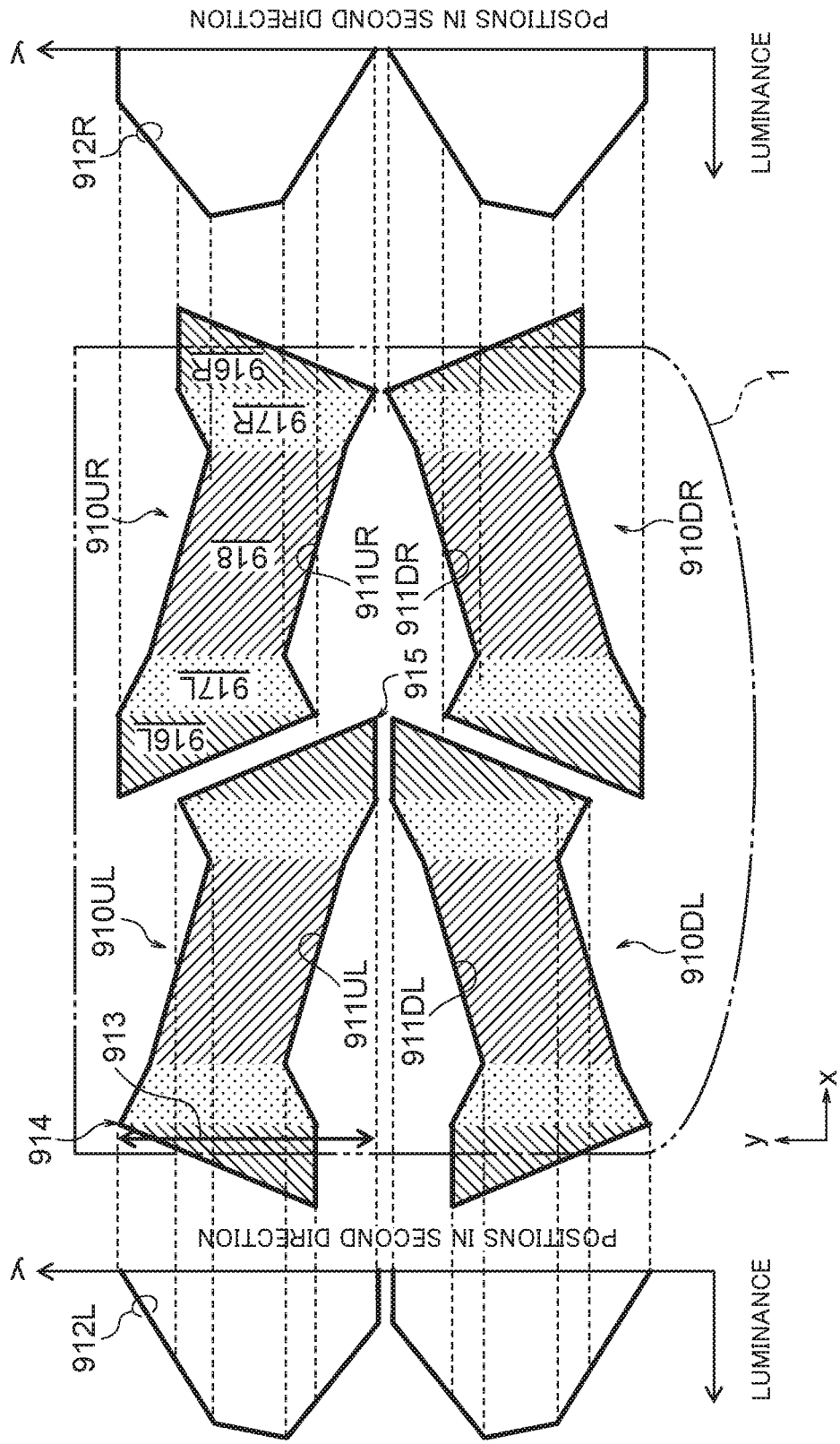

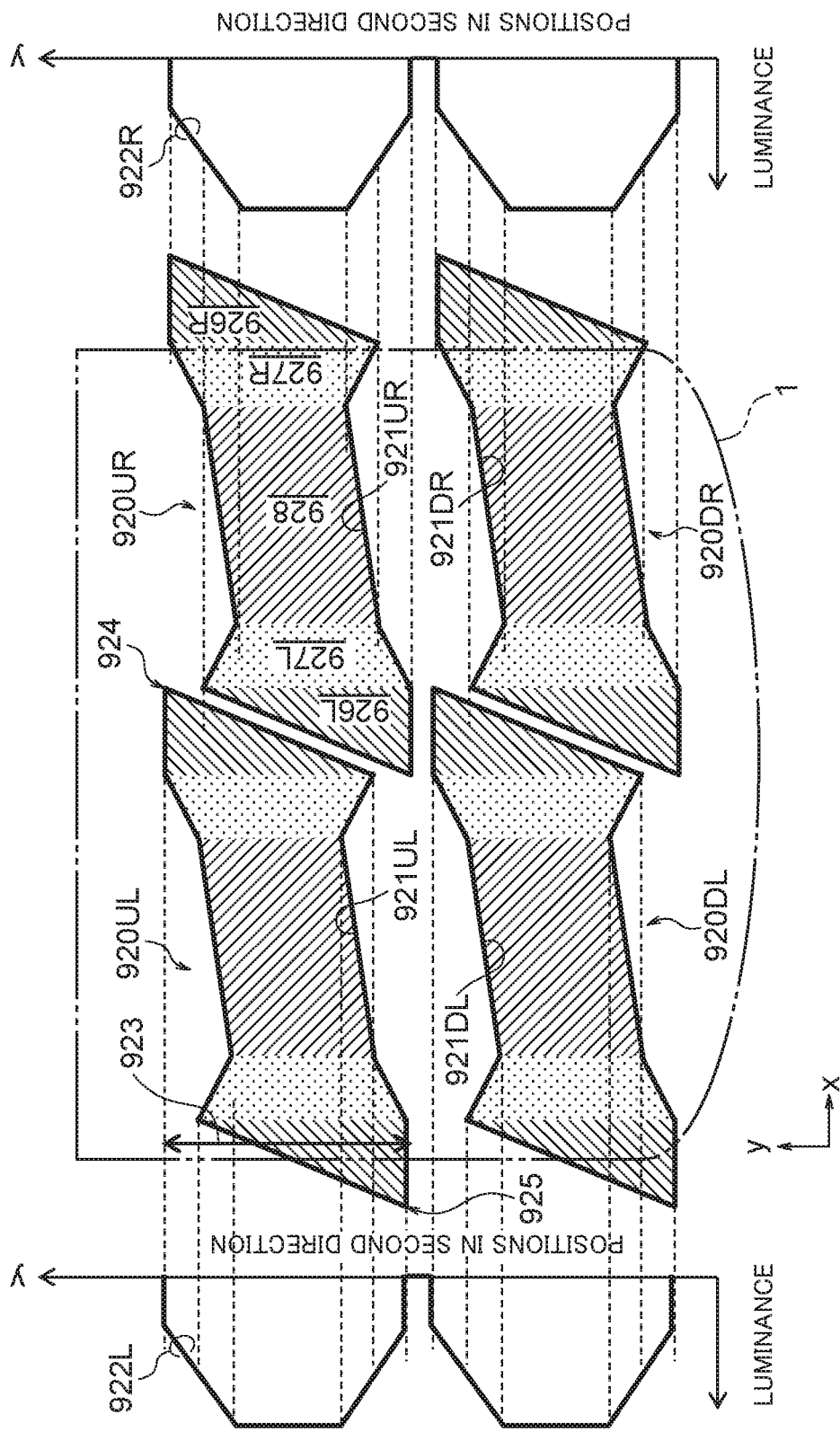

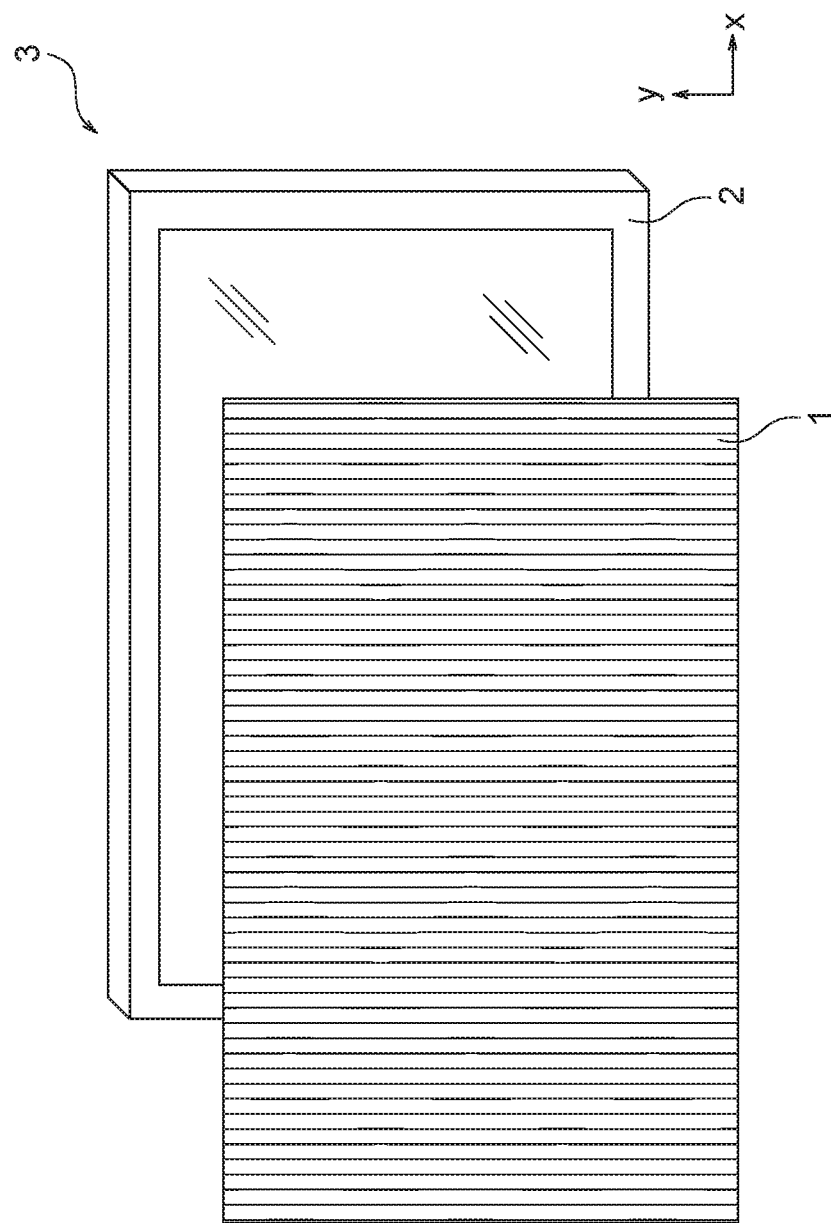

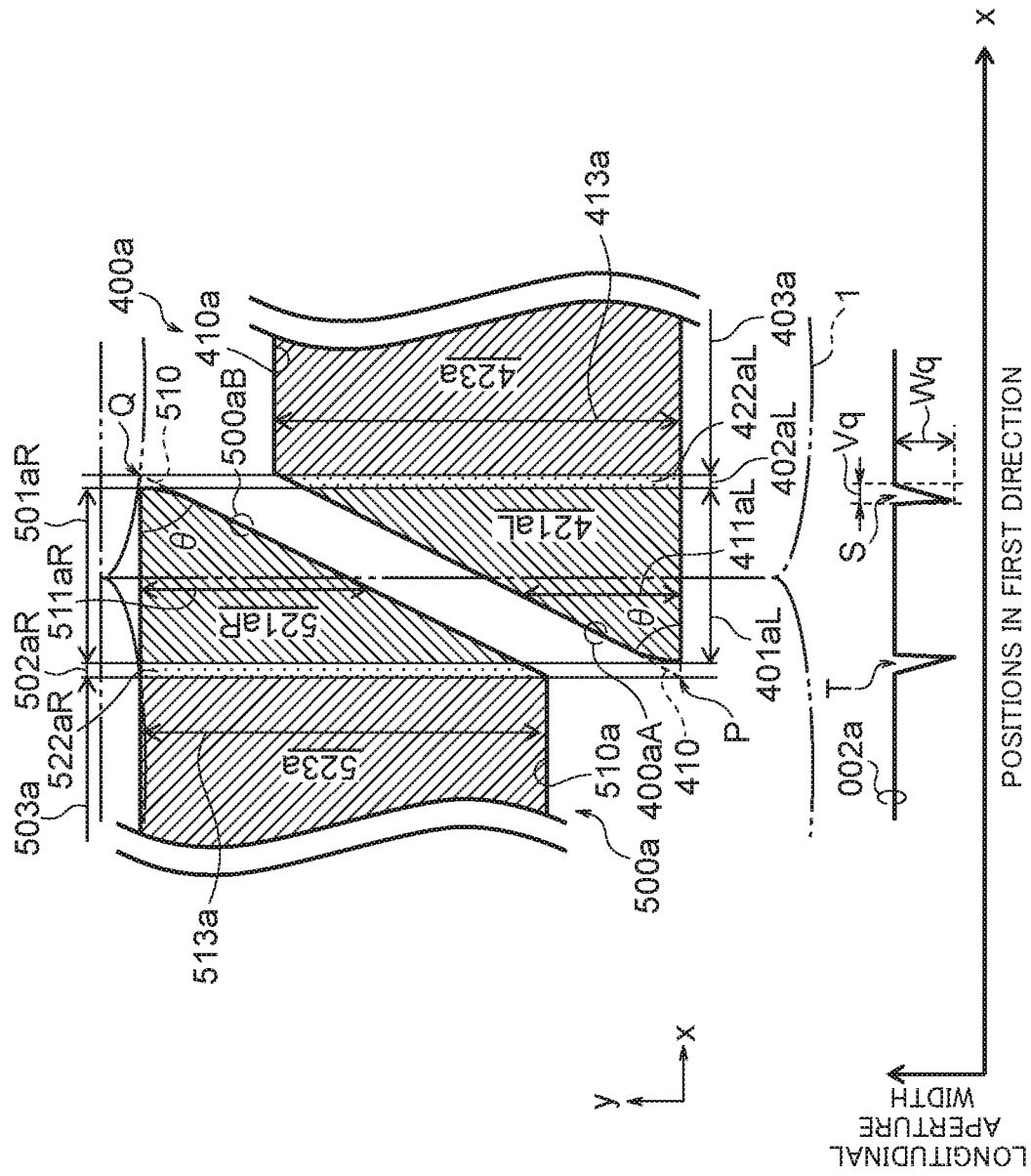

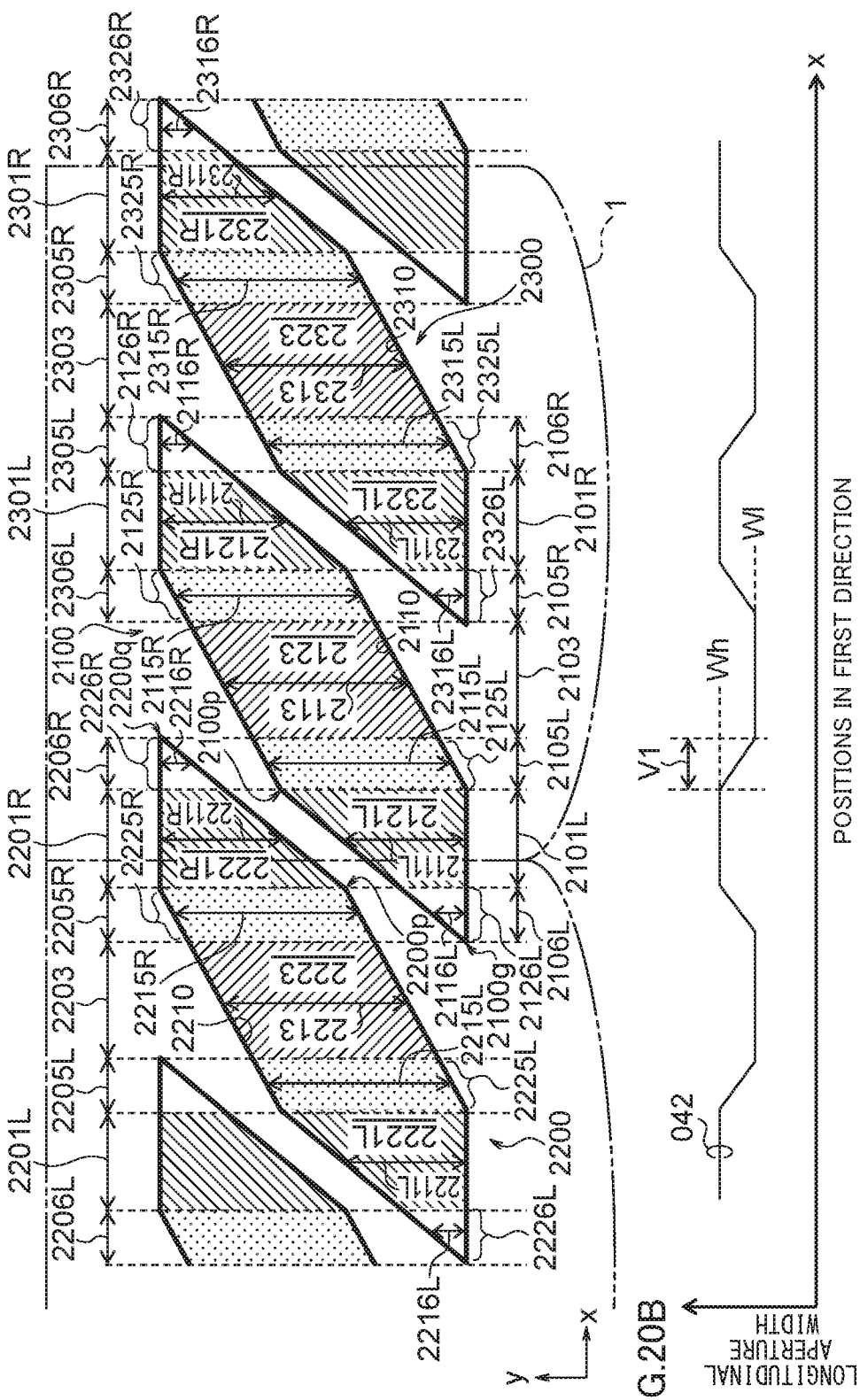

FIG.24A

| n-th ROW | RIGHT | LEFT | RIGHT | LEFT | RIGHT | LEFT | RIGHT | LEFT | RIGHT | LEFT |
|---|---|---|---|---|---|---|---|---|---|---|
| (n+1)-thROW | A | A | B | B | A | A | B | B | A | B |
| (n+2)-thROW | A | A | B | B | A | A | B | B | A | B |
| (n+3)-thROW | A | A | B | B | A | A | B | B | A | B |
| (n+4)-thROW | A | A | B | B | A | A | B | B | A | B |
| (n+5)-thROW | A | A | B | B | A | A | B | B | A | B |

FIG.24B

| n-th ROW | RIGHT | LEFT | RIGHT | LEFT | RIGHT | LEFT | RIGHT | LEFT |
|---|---|---|---|---|---|---|---|---|
| (n+1)-thROW | A | B | B | A | A | B | B | A |
| (n+2)-thROW | A | B | B | A | A | B | B | A |
| (n+3)-thROW | A | B | B | A | A | B | B | A |
| (n+4)-thROW | A | B | B | A | A | B | B | A |
| (n+5)-thROW | A | B | B | A | A | B | B | A |

FIG.24C

| n-th ROW | 1 | 2 | 3 | 4 | ... | N | 1 | 2 | 3 | 4 | ... | N | 1 |
|---|---|---|---|---|---|---|---|---|---|---|---|---|---|
| (n+1)-thROW | A | B | A | B | ... | B | B | A | B | B | ... | B | A |
| (n+2)-thROW | A | B | A | B | ... | B | B | A | B | B | ... | B | A |
| (n+3)-thROW | A | B | A | B | ... | B | B | A | B | B | ... | B | A |
| (n+4)-thROW | A | B | A | B | ... | B | B | A | B | B | ... | B | A |
| (n+5)-thROW | A | B | A | B | ... | B | B | A | B | B | ... | B | A |

FIG.25A

| | RIGHT | LEFT | RIGHT | LEFT | RIGHT | LEFT | RIGHT | LEFT | RIGHT | LEFT |
|---|---|---|---|---|---|---|---|---|---|---|
| n-th ROW | A | B | A | B | A | B | A | B | A | B |
| (n+1)-th ROW | B | A | B | A | B | A | B | A | B | A |
| (n+2)-th ROW | A | B | A | B | A | B | A | B | A | B |
| (n+3)-th ROW | B | A | B | A | B | A | B | A | B | A |
| (n+4)-th ROW | A | B | A | B | A | B | A | B | A | B |
| (n+5)-th ROW | B | A | B | A | B | A | B | A | B | A |

FIG.25B

| | RIGHT | LEFT | RIGHT | LEFT | RIGHT | LEFT | RIGHT | LEFT | RIGHT | LEFT |
|---|---|---|---|---|---|---|---|---|---|---|
| n-th ROW | A | B | A | B | A | B | A | B | A | B |
| (n+1)-th ROW | B | A | A | B | B | A | A | B | B | A |
| (n+2)-th ROW | B | A | B | A | A | B | B | A | A | B |
| (n+3)-th ROW | A | B | A | B | B | A | A | B | A | B |
| (n+4)-th ROW | A | B | B | A | A | B | B | A | A | B |
| (n+5)-th ROW | B | A | A | B | B | A | A | B | B | A |

FIG.26A

| | RIGHT (R) | LEFT (G) | RIGHT (B) | LEFT (R) | RIGHT (G) | LEFT (B) | RIGHT (R) | LEFT (G) | RIGHT (B) | LEFT (R) | RIGHT (G) | LEFT (B) | RIGHT (R) | LEFT (G) | RIGHT (B) |
|---|---|---|---|---|---|---|---|---|---|---|---|---|---|---|---|
| n-th ROW | A | B | A | B | A | B | A | B | A | B | A | B | A | B | A |
| (n+1)-thROW | B | A | B | A | B | A | B | A | B | A | B | A | B | A | B |
| (n+2)-thROW | A | B | A | B | A | B | A | B | A | B | A | B | A | B | A |
| (n+3)-thROW | B | A | B | A | B | A | B | A | B | A | B | A | B | A | B |
| (n+4)-thROW | A | B | A | B | A | B | A | B | A | B | A | B | A | B | A |
| (n+5)-thROW | B | A | B | A | B | A | B | A | B | A | B | A | B | A | B |

FIG.26B

| | RIGHT | LEFT | RIGHT | LEFT | RIGHT | LEFT | RIGHT | LEFT |
|---|---|---|---|---|---|---|---|---|
| n-th ROW (R) | A | B | A | B | A | B | A | B |
| (n+1)-thROW (G) | B | A | B | A | B | A | B | A |
| (n+2)-thROW (B) | A | B | A | B | A | B | A | B |
| (n+3)-thROW (R) | B | A | B | A | B | A | B | A |
| (n+4)-thROW (G) | A | B | A | B | A | B | A | B |
| (n+5)-thROW (B) | B | A | B | A | B | A | B | A |

STEREOSCOPIC DISPLAY DEVICE

CROSS-REFERENCE TO RELATED APPLICATION

This application is based upon and claims the benefit of priority from Japanese patent application No. 2014-258568, filed on Dec. 22, 2014, and Japanese patent application No. 2015-202118, filed on Oct. 13, 2015, the disclosure of which is incorporated herein in its entirety by reference.

BACKGROUND OF THE INVENTION

1. Field of the Invention

The present invention relates to a stereoscopic display device which provides stereoscopic images to observers with naked eyes.

2. Description of the Related Art

A naked-eye type stereoscopic display device does not require any special eyeglasses, so that the observer can enjoy stereoscopic images readily. With personal mobile terminals such as mobile phones, smartphones, and feature phones and household display devices such as television set receivers, such techniques for achieving in naked-eye type stereoscopic display are being developed rapidly.

The naked-eye type stereoscopic display techniques achieve stereoscopic display by giving directivity to the light emitted from a display and providing parallax images to each of the both eyes of an observer. Examples thereof may be a 2-viewpoint stereoscopic image display technique, a multiple-viewpoint stereoscopic image display technique, and an integral photography (IP) technique.

There are various members as a light-ray control module for giving the directivity to the emitted light. Examples thereof may be a type which utilizes a lens or a barrier on the display surface and a type in which the light emitted from the display device itself has the directivity.

A display panel is typically formed by arranging, in a matrix form, pixels each displaying a minimum element of an image. In a naked-eye type stereoscopic display device, it is necessary to display viewpoint images corresponding to the number of viewpoints. Thus, sub-pixels for displaying minimum elements of the viewpoint images are required further.

Note here that there are cases where an element having a color expressing function for displaying a color of an image is referred to as a "sub-pixel". For example, such term is used in an expression "a pixel constituted with sub-pixels of red, green and blue". However, if it is not specifically mentioned, the "sub-pixel" in the current Specification is defined to be an element including a viewpoint image displaying function for convenience. Note that the sub-pixel in the current Specification can also include a color expressing function.

The sub-pixel is a device for converting an electric signal into an optical signal. The region between a sub-pixel and another sub-pixel is a region where optical conversion cannot be done. When a part, which is not intended to be viewed, in that region is viewed by an observer in an expanded manner due to the light-ray control module, a sense of discomfort is given to the observer. The state of such image quality is referred to as 3D moiré.

As a countermeasure for 3D moiré, there is proposed a related technique with which an overlapping region is provided in optical aperture parts of two sub-pixels neighboring to each other in the viewpoint direction and the total values of the longitudinal aperture widths are set to be constant (Japanese Unexamined Patent Publication Hei 10-186294 (Patent Document 1)). Further, also proposed is a related technique with which the total values of the longitudinal aperture widths are set to be constant by utilizing the sub-pixels arranged over a plurality of rows (Japanese Unexamined Patent Publication 2008-249887 (Patent Document 2)). Furthermore, also proposed is a related technique with which the visibility of 3D moiré is decreased by devising the longitudinal aperture widths in the overlapping regions of the sub-pixels (Japanese Unexamined Patent Publication 2012-063556 (Patent Document 3)).

However, there is such an issue that the visibility of 3D moiré cannot be decreased sufficiently even when the above-described related techniques are used. This issue will be described in details hereinafter by using FIG. 15A to FIG. 17.

Referring to FIG. 15A, an ideal sub-pixel structure will be described. Two sub-pixels 400 and 500 are disposed neighboring to each other in a first direction x. Lenses 1 as a light-ray control modules are disposed at positions corresponding to the sub-pixels 400, 500 along the first direction x repeatedly. Due to such structure, the first direction x coincides with the light-ray separating direction. Note that shapes of optical aperture parts 410, 510 or the two sub-pixels 400, 500 are considered to be roughly in a parallelogram form for convenience sake in terms of explanation.

First, considered is a case where the aperture part 410 is divided into two sections in the first direction x. In a certain section along the first direction x, the aperture part 410 overlaps with the aperture part 510 in a second direction y. Such section is referred to as an overlapping section 401L. Further, in the other section along the first direction x, the aperture part 410 does not overlap with the aperture part 510 in the second direction y. Such section is referred to as an aperture width constant section 403.

Accordingly, the shape of the aperture part 410 is also considered by dividing it into two regions along the first direction x. Out of the aperture part 410, a region belonging to the overlapping section 401L is referred to as an overlapping region 421L, while a region belonging to the aperture width constant section 403 is referred to as an aperture width constant region 423. This can be considered the same in the case of the neighboring aperture part 510. Out of the aperture part 510, a region belonging to an overlapping section 501R is referred to as an overlapping region 521R, while a region belonging to an aperture width constant section 503 is referred to as an aperture width constant region 523. Note that the overlapping sections are the sections regulated by overlap of the aperture parts 410 and 510 in the second direction y, so that the positions of the overlapping sections 401L and 501R in the first direction x coincide with each other.

Now, the width of the second direction y out of the widths of the aperture part is defined as "longitudinal aperture width". The longitudinal aperture widths 413, 513 of the aperture width constant regions 423, 523 are constant regardless of the positions in the first direction x. In the meantime, the longitudinal aperture widths 411L, 511R in the overlapping sections 401L, 501R vary according to the positions in the first direction x.

Further, at the same position in the first direction x within the overlapping sections 401L and 501R, the value of "411L+511R" that is the sum of the longitudinal aperture widths 411L and 511R (referred to as "sum of longitudinal aperture widths" hereinafter) is constant. Further, the sum of the longitudinal aperture widths "411L+511R" and the longitudinal aperture width 413 as well as the longitudinal aperture width 513 take the same values with each other.

Next, let's look into the total value of the longitudinal aperture widths of a sub-pixel group arranged in the first direction among the sub-pixels arranged in matrix on a display panel. FIG. 15B is a graph showing, with a plot 002, the relation between the positions in the first direction and the total value of the longitudinal aperture widths in the ideal sub-pixel structure shown in FIG. 15A. Note here that the total value of the longitudinal aperture widths is the sum of the two longitudinal aperture widths "411L+511W" in the overlapping sections 401L and 501R. It is the value of the longitudinal aperture width 413 in the aperture width constant section 403, while it is the value of the longitudinal aperture width 513 in the aperture width constant section 503.

As described above, the sum of the longitudinal aperture widths "411L+511W", the longitudinal aperture width 413, and the longitudinal aperture width 513 take the same values with each other, so that the plot 002 is always constant for the positions in the first direction x. Thereby, generation of 3D moiré in the light-ray separating direction is to be suppressed.

Incidentally, there are various elements for constituting the optical aperture shapes of actual sub-pixels depending on the types of the electro-optical elements. Examples thereof are a black matrix, signal wirings, and the like in a liquid crystal display, partition walls, display electrodes and the like in a plasma display, a light emission layer region, signal wirings, and the like in an organic EL display. Each of those elements is manufactured by using a photolithography technique in general. Thus, the precision of those shapes depends on the pattern precision of the photolithography technique.

Considering the currently used typical materials and manufacturing devices for photolithography, it is difficult to completely eliminate processing variation of about several µm as the shape precision. Further, in order to control the processing variation to be less than the order of sub-µm level, expensive materials and manufacturing devices are required. Thus, it is difficult to provide inexpensive stereoscopic display devices. There is not a little shape dependency existing in the processing variation. Especially, the processing precision variation of a bent shape including an acute angle is relatively large. Due to the processing precision variation, fluctuation may be generated in the quality of the acquired products, e.g., the corner of the optical aperture part of the sub-pixel may be rounded, the optical aperture part may become small or large as a whole, and the like.

FIG. 16A is an explanatory chart showing changes in the longitudinal aperture width when the corner of the aperture part is rounded with respect to the ideal sub-pixel structure shown in FIG. 15A. The ideal sub-pixel aperture parts 410, 510 and the aperture parts 410a, 510a of the sub-pixels 400a, 500a having rounded corners P, Q are illustrated in a corresponding manner.

The overlapping sections 401aL, 501aR of the aperture parts 410a, 510a having the rounded corners P, Q become smaller than the overlapping sections of the ideal aperture parts 410, 510. Further, because of this change, an aperture width fluctuating section 402aL appears between the overlapping section 401aL and the aperture width constant section 403a, and an aperture width fluctuating section 502aR appears between the overlapping section 501aR and the aperture width constant section 503a. Those aperture width fluctuating sections 402aL, 502aR are generated when the parts to become overlapping sections with the ideal aperture parts 410, 510 come to have the rounded corners P, Q due to the processing precision variation so that the aperture parts do not exist in those sections.

FIG. 16B shows the results acquired by paying attention to the positions in the first direction and the total values of the longitudinal aperture widths of the sub-pixel group arranged in the first direction in such case. That is, FIG. 16B is a graph showing the relation between the positions in the first direction and the total values of the longitudinal aperture widths regarding the aperture part having the rounded corner.

As shown with a plot 002a in FIG. 16B, in accordance with the appearance of the aperture width fluctuating sections 402aL, 502aR caused by the influence of the rounded corners Q, P, positions S, T at which the value of the longitudinal aperture width radically decreases in those sections are generated locally. The value of the sum of the longitudinal aperture widths "411aL+511aR" of the other overlapping sections 401aL, 501aR and each of the values of the longitudinal aperture widths 413a, 513a of the aperture width constant sections 403a, 503a do not change since those are not affected by the rounded corners P, Q.

There are a longitudinal aperture width change value Wq and a longitudinal aperture width change section Vq at the positions S and T. The longitudinal aperture width change value Wq depends on the angle θ of a side (e.g., an aperture side 400aA, 500aB, or the like) existing in the overlapping section within the aperture part with respect to the first direction x. Further, the longitudinal aperture width change section Vq depends on the size of the rounded corners P, Q in addition to the extent of the angle θ.

FIG. 17 is a graph showing the relations regarding the angle θ of the aperture part, the longitudinal aperture width change value Wq, and the longitudinal aperture width change section Vq in a case where the corner of the aperture part is rounded.

As shown in FIG. 17, when the angle θ becomes larger, the longitudinal aperture width change value Wq becomes larger while the longitudinal aperture width change section Vq becomes smaller. Inversely, when the angle θ becomes smaller, the longitudinal aperture width change value Wq becomes smaller while the longitudinal aperture width change section Vq becomes larger. Therefore, in terms of 3D moiré, it is advantageous to have a smaller angle θ. However, when the angle θ is too small, the overlapping section of the sub-pixels becomes extremely large so that the 3D crosstalk property tends to be deteriorated.

Further, in a case where the sub-pixel size and the layout pitch are designed to be small in accordance with the recent tendency of ultra-high definition, the angle θ also becomes large. Thus, 3D moiré is deteriorated as described above. Therefore, with the ideal sub-pixel structure shown in FIG. 15A, it is essential to deal with such issue.

FIG. 18 is a chart showing 3D moiré generated when the value of the longitudinal aperture width is decreased radically due to rounding of the corner shown in FIG. 16B by using the relation between the observer and stereopsis regions. The lateral axis of FIG. 18 shows the observing angles in the first direction, and the longitudinal axis shows the luminance distribution with respect to the observing angles. The two kinds of dotted lines show the luminance distributions when an image is outputted only to either one of the pixels, assuming that a sub-pixel 400a is a right-eye pixel and a sub-pixel 500a is a left-eye pixel. That is, Y1 is the luminance distribution when white is displayed on the right-eye pixel and black is displayed on the left-eye pixel, Y2 is the luminance distribution when black is displayed on the right-eye pixel and white is displayed on the left-eye pixel, and Y3 is the luminance distribution when white is displayed on the both pixels. Basically, the relation regarding the luminance can be expressed as Y3=Y1+Y2.

Note here that a right-eye observing region is 800R, and a left-eye observing region is 800L. As shown in FIG. 18, in a case where the both eyes of the observer are located at the centers of each of the observing regions, the observer does not recognize 3D moiré. However, in a case where the both eyes of the observer are located in the vicinity of the borders (e.g., positions T, S) of each of the observing regions, the observer recognizes the radical luminance change and thereby perceives 3D moiré.

Note that the 3D moiré is called herein as black moiré when the image luminance is radically decreased. Inversely, it is called herein as white moiré when the image luminance is increased. FIG. 18 is a case where black moiré is generated.

When the ideal pixel shape shown in the related techniques is applied to the actual display panel, 3D moiré is to be visually recognized due to a steep luminance difference generated according to shift in the observing position caused by variation in the processing precision. As a countermeasure for that, it is considered to achieve an ideal shape by adding a correction pattern to the acute angle part, for example. However, in that case, even when the correction pattern is added, the processing precision variation cannot be absorbed sufficiently. Not only that, there still remains such an issue that the correction pattern itself cannot be disposed or that the correction pattern cannot function when high definition is advanced.

As a countermeasure for 3D moiré, considered is a method with which the luminance increase/decrease is eased by employing defocus of a lens. When employing defocusing, the distance from the lens vertex to the sub-pixel (referred to as "lens-pixel distance" hereinafter) is changed with respect to the focal distance of the lens to "blur" the steep luminance difference for improving the 3D moiré. However, this means to shift the focal distance intentionally, so that the stereoscopic display property typically 3D crosstalk is worsened.

Further, when using defocusing, it is important to keep the lens-pixel distance constant with high precision. When variation in the lens-pixel distance is large, defocusing is worsened further so that the 3D crosstalk property is deteriorated greatly. The 3D crosstalk herein means a phenomenon where a certain viewpoint image is mixed into another viewpoint image and displayed when performing stereoscopic display. In order to keep the lens-pixel distance constant with high precision, high processing precision is required not only for the lens manufacturing technique but also for the display panel manufacturing technique.

In a display panel where sub-pixels of narrow pitch are disposed in matrix for achieving higher definition, variation in the processing precision becomes relatively larger. Thereby, the change in the longitudinal aperture width becomes still greater. Further, the number of the sub-pixels in the display region of the display panel having a large number of pixels becomes relatively greater, so that it is necessary to keep the processing precision over a wide range of the display panel.

It is therefore an exemplary object of the present invention to provide a naked-eye type stereoscopic display device which can achieve a fine stereoscopic display property while achieving high-definition display and high yield.

SUMMARY OF THE INVENTION

The stereoscopic display device according to an exemplary aspect of the invention is a stereoscopic display device which includes: a display panel including sub-pixels with optical aperture parts being disposed in a matrix form in a first direction and a second direction that is roughly perpendicular to the first direction; and a light-ray control module which is provided by opposing to the display panel for controlling light rays towards the first direction, wherein: each of the aperture parts of two of the sub-pixels neighboring to each other in the first direction includes an overlapping region overlapping with each other in the second direction and an non-overlapping region not overlapping with each other; provided that a width of the aperture part in the second direction is defined as a longitudinal aperture width, the non-overlapping region includes an aperture width fluctuating region where the longitudinal aperture width changes continuously from roughly a center of the aperture part towards both ends of the first direction, respectively; and a sum of the longitudinal aperture widths of the two overlapping regions overlapping with each other located at a same position in the first direction is larger than the longitudinal aperture width in roughly the center of the aperture part.

As an exemplary advantage according to the invention, the present invention can achieve a fine stereoscopic display property even with a naked-eye type stereoscopic display device which employs a display panel with narrow-pitch sub-pixels or a display panel with a large number of pixels.

BRIEF DESCRIPTION OF THE DRAWINGS

FIG. 9A is a fragmentary elevational view showing a case where corners of the aperture parts in the second exemplary embodiment are rounded, and FIG. 9B is a graph showing the relation between positions in the first direction and longitudinal aperture widths in the case shown in FIG. 9A;

FIG. 10A is a fragmentary elevational view showing the structure of Comparative Example of a third exemplary embodiment, FIG. 10B is a first graph showing the relation between positions in a second direction and luminance in Comparative Example of the third exemplary embodiment, and FIG. 10C is a second graph showing the relation between positions in the second direction and luminance in Comparative Example of the third exemplary embodiment;

FIG. 11A is a fragmentary elevational view showing the structure of Example 1 of the third exemplary embodiment, FIG. 11B is a first graph showing the relation between positions in the second direction and luminance in Example 1 of the third exemplary embodiment, and FIG. 11C is a second graph showing the relation between positions in the second direction and luminance in Example 1 of the third exemplary embodiment;

FIG. 12A is a fragmentary elevational view showing the structure of Example 2 of the third exemplary embodiment, FIG. 12B is a first graph showing the relation between positions in the second direction and luminance in Example 2 of the third exemplary embodiment, and FIG. 12C is a second graph showing the relation between positions in the second direction and luminance in Example 2 of the third exemplary embodiment;

FIG. 13 is a detailed perspective view showing a stereoscopic display device according to each Example of each exemplary embodiment;

FIG. 16A is a fragmentary elevational view showing a case where corners of the aperture parts in the related technique are rounded, and FIG. 16B is a graph showing the relation between positions in the first direction and longitudinal aperture widths in the case shown in FIG. 16A;

FIG. 20A is a fragmentary elevational view showing the structure of Example 2 of the fourth exemplary embodiment, and FIG. 20B is a graph showing the relation between positions in the first direction and longitudinal aperture widths in Example 2 of the fourth exemplary embodiment;

FIG. 24A is a chart showing a first structural example of Example 3 of the fifth exemplary embodiment, FIG. 24B is a chart showing a second structural example of Example 3 of the fifth exemplary embodiment, and FIG. 24C is a chart showing a third structural example of Example 3 of the fifth exemplary embodiment;

FIG. 25A is a chart showing a first structural example of Example 4 of the fifth exemplary embodiment, and FIG. 25B is a chart showing a second structural example of Example 4 of the fifth exemplary embodiment; and FIG. 26A is a chart showing a first structural example of Example 5 of the fifth exemplary embodiment, and FIG. 26B is a chart showing a second structural example of Example 5 of the fifth exemplary embodiment.

DETAILED DESCRIPTION OF THE PREFERRED EMBODIMENTS

Figure 1:
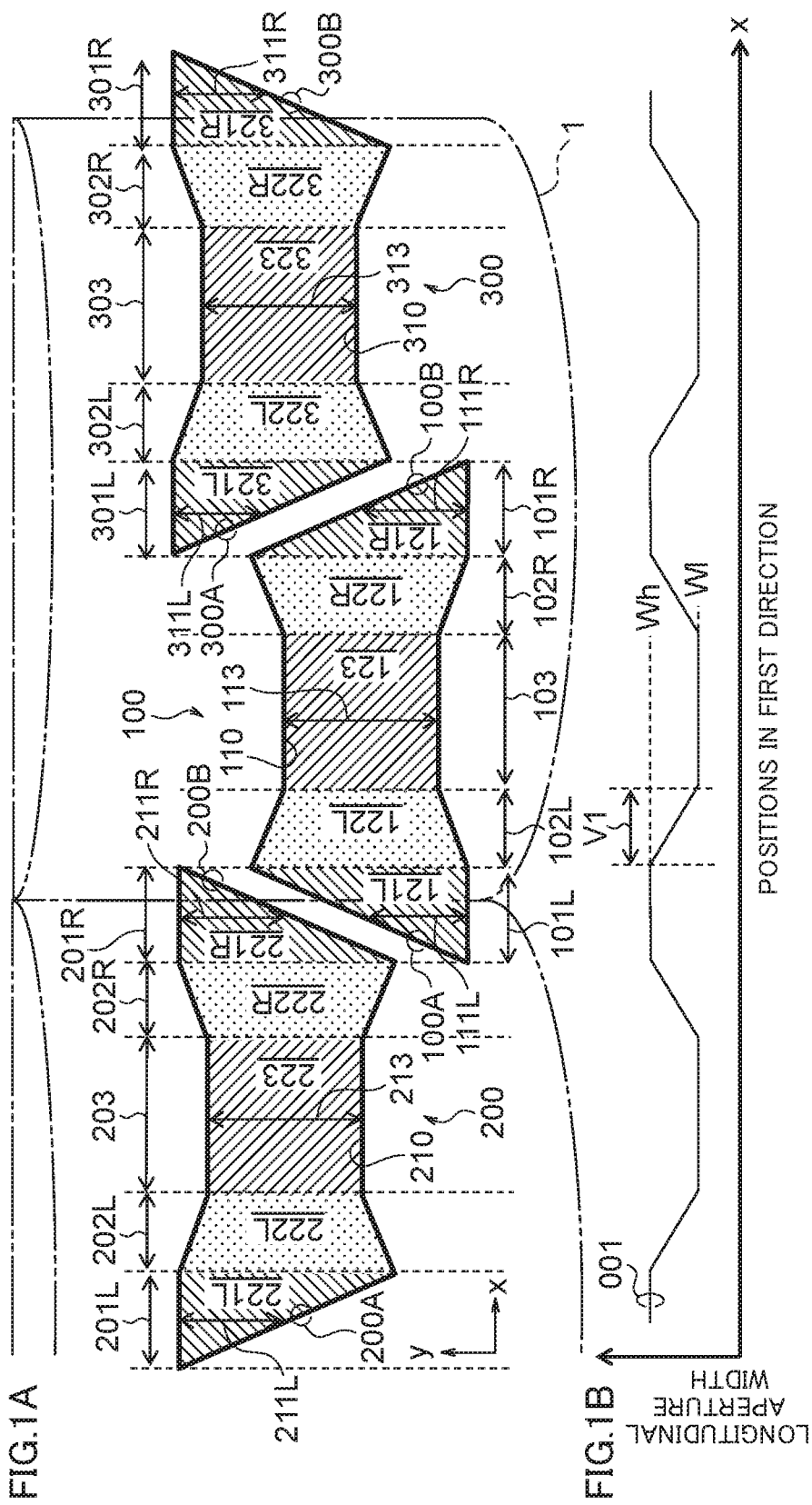
FIG. 1A is a fragmentary elevational view showing the structure of Example 1 of a first exemplary embodiment.
FIG. 1B is a graph showing the relation between positions in a first direction and longitudinal aperture widths in Example 1 of the first exemplary embodiment.

Hereinafter, modes (referred to as "exemplary embodiments" hereinafter) for embodying the present invention will be described by referring to the accompanying drawings. Note that same reference numerals are used for substantially the same structural elements in current Specification and the Drawings. Hatching in the drawings does not mean a cut section but is applied for allowing those skilled in the art to comprehend easily.

(Overall Structures)

The overall structures of a stereoscopic display device that is in common to each exemplary embodiment and each Example according to the present invention will be described by referring to FIG. 13 and FIG. 14. As shown in FIG. 13, a stereoscopic display device 3 includes: a display panel 2 which is provided with sub-pixels (to be described later) including optical apertures, which are disposed in matrix along a first direction x and a second direction y that is roughly perpendicular to the first direction x; and a lens 1 which is disposed by opposing to the display panel 2 and function as a light-ray control module for controlling light rays towards the first direction x. The lens 1 is disposed on the observer side of the display panel 2. The lens 1 and the display panel 2 are illustrated by being separated from each other in FIG. 13 to be easily comprehended. In practice, however, the lens 1 and the display panel 2 are used by being in contact with each other as shown in FIG. 14.

The stereoscopic display device 3 may be of any types as long as it includes the display panel 2 on which the sub-pixels (to be described later) of the present invention are arranged in matrix. The display panel 2 may be a plasma display device or an organic EL display as a self-luminous type display device or a non-self-luminous type liquid crystal display, for example. Further, as the lens 1 as the light-ray control module, a lenticular lens, a GRIN lens, a fly-eye lens, or the like can be employed.

Figure 14:
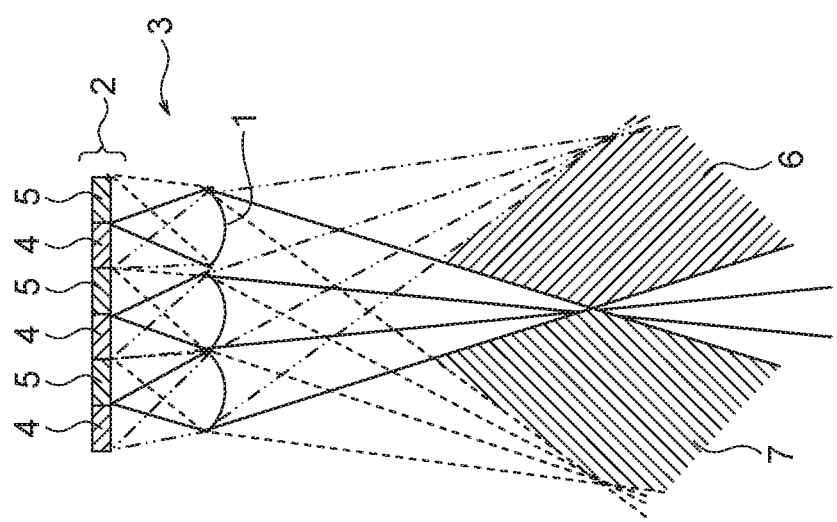
FIG. 14 is a fragmentary plan view of the stereoscopic display device shown in FIG. 13 viewed from the above.
Figures 15A, 15B:
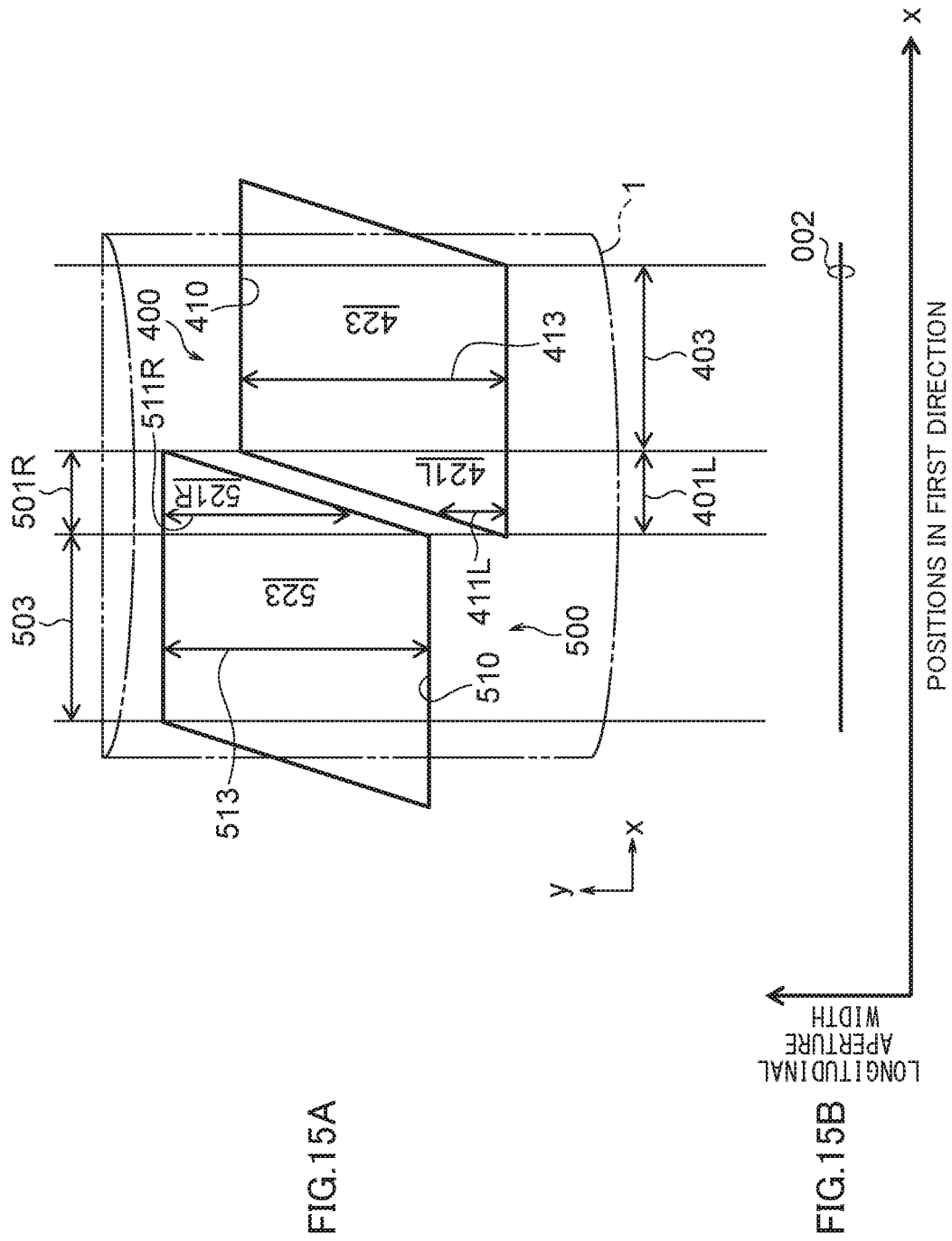
FIG. 15A is a fragmentary elevational view showing the structure of a related technique.
FIG. 15B is a graph showing the relation between positions in the first direction and longitudinal aperture widths according to the related technique.
Figure 17:
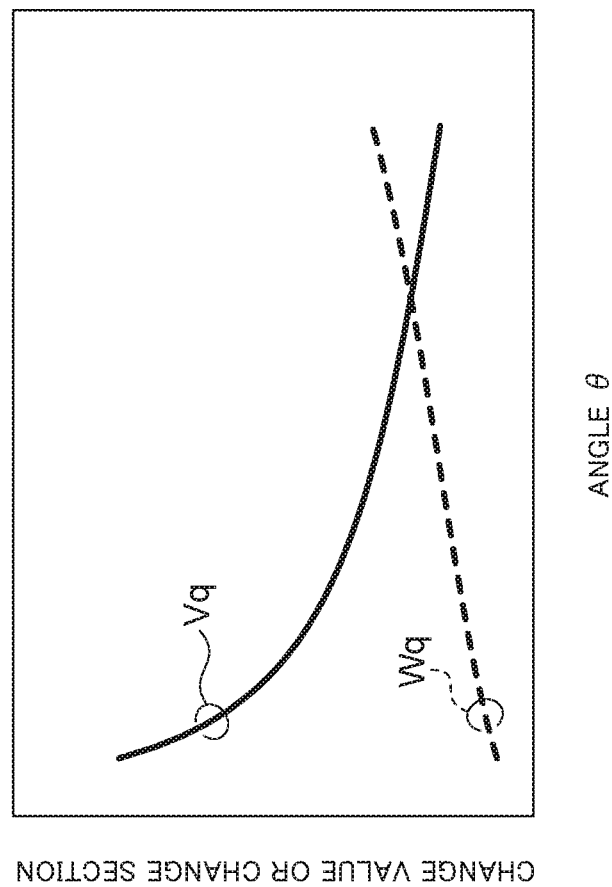
FIG. 17 is a graph showing the relation regarding the angle θ of the corner of an aperture part, a longitudinal aperture width change value Wq, and a longitudinal aperture width change section Vq in a case where corners of the aperture parts in the related technique are rounded.
Figure 18:
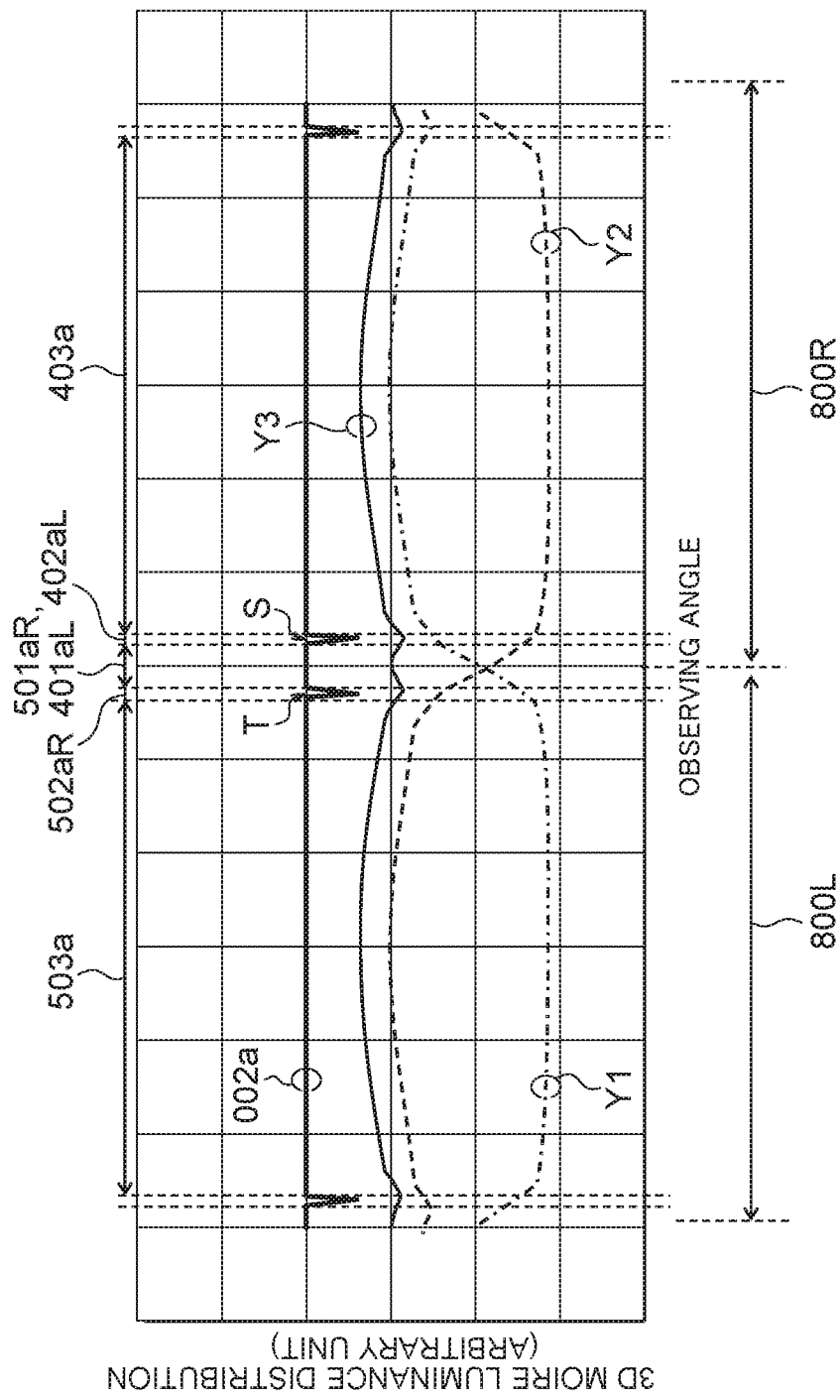
FIG. 18 is a graph showing 3D moiré recognized by the observer in a case where the corners of the aperture parts in the related technique are rounded.

FIG. 14 is a plan view of a part of the stereoscopic display device 3 shown in FIG. 13 viewed from the above. First-viewpoint sub-pixels 4 and second-viewpoint sub-pixels 5 are arranged in matrix on the display panel 2, and unit lenses of the lens 1 are disposed by corresponding to the sub-pixel pairs. On the observing plane side, a first viewpoint image view field 6 and a second viewpoint image view field 7 are formed. It is not essential for the light-ray control module to be the lens 1 as long as view fields of each viewpoint can be formed on the observing plane side. It is possible to employ a parallax barrier or a type with which the emission light itself has the directivity. While FIG. 14 shows the 2-viewpoint stereoscopic display device 3, the present invention can be applied to a multi-viewpoint type or an IP (integral photography) type stereoscopic display device through changing the pitch of the sub-pixels and the light-ray control modules, for example.

First Exemplary Embodiment (Example 1)

Example 1 of the first exemplary embodiment will be described by referring to FIG. 1A. FIG. 1A shows three sub-pixels 100, 200, and 300 disposed in parallel in the first direction x out of a great number of sub-pixels disposed in matrix. That is, the sub-pixels 100, 200, and 300 of Example 1 are arranged along the first direction x. The unit lenses of the lens 1 as the light-ray control modules are disposed at the positions corresponding to a pair of sub-pixels 100, 300, and arranged repeatedly along the first direction x. Because of such structure, the first direction x is roughly in parallel to the observer viewpoint direction that is the light-separating direction.

Hereinafter, the sub-pixel 100 will be focused and described, while the reference numerals of the neighboring sub-pixels 200 and 300 will also be written in parenthesis as appropriate. Further, for those expressed with L or R added in the end of the reference numerals, the reference numerals alone by omitting L or R are used as the general terms thereof. For example, overlapping sections 101L and 101R can be expressed as the overlapping section 101 as the general term. Such rules regarding the reference numerals are the same in each of other exemplary embodiments and Examples.

First, the outline of Example 1 will be described. Respective aperture parts 110 (210, 310) of two sub-pixels 100 (200, 300) neighboring to each other in the first direction x have overlapping regions 121 (221, 321) which overlap with each other in a second direction y and non-overlapping regions (aperture width fluctuating regions and aperture width constant regions to be described later) which do not overlap with each other. Provided that the width in the second direction y of the aperture part 110 (210, 310) is defined as a longitudinal aperture width, the non-overlapping region include an aperture width fluctuating region 122 (222, 322) which continuously changes towards the both ends of the first direction x from roughly the center of the aperture part 110 (210, 310). The sums of the longitudinal aperture widths of the two overlapping regions 121 (221, 321) which overlap with each other at the same position in the first direction x, "111L+211R" and "111R+311L", are larger than the longitudinal aperture widths 113 (223, 323) roughly in the centers of the aperture parts 110 (210, 310).

The sums of the longitudinal aperture widths of the two overlapping regions 121 (221, 321) which overlap with each other at the same position on the first direction x, "111L+211W" and "111R+311L", may be defined to be same at any positions in the first direction x or may be defined to be within a range that is over 1 time and equal to 1.12 times or less of the longitudinal aperture widths 113 (213, 313) in roughly the centers of the aperture parts 110 (210, 310). Defining that peripheral sides of the aperture part 110 as aperture sides, all the aperture sides included in the aperture width fluctuating regions 122 (222, 322) may not be in parallel to the aperture sides included in the overlapping regions 121 (221, 321). Non-overlapping regions may include the aperture width constant regions 123 (223, 323) where the longitudinal aperture widths 113 (213, 313) are same at any positions in the first direction x.

Hereinafter, Example 1 will be described in more details. The sub-pixel 100 (200, 300) includes three sections, i.e., an aperture width constant section 103 (203, 303), an overlapping section 101 (201, 301), and an aperture width fluctuating section 102 (202, 302) in the first direction x.

The aperture width constant region 123 (223, 323) exists in the aperture width constant section 103 (203, 303). In the aperture width constant region 123 (223, 323), the longitudinal aperture width 113 (213, 313) of the aperture part 110 (210, 310) is constant in the first direction x. Note that the aperture part 110 and the aperture parts 210, 310 are arranged to be shifted from each other in terms of the positions in the second direction y, and each of the shapes are in a rotational symmetric relation of 180 degrees with respect to each other.

The overlapping region 121 (221, 321) exists in the overlapping section 101 (201, 301). In the overlapping region 121 (221, 321), the aperture part 110 (210, 310) overlaps with each other in the second direction y. The aperture part 110 is adjacent to the two aperture pats 210 and 310 in the first direction, so that there are two each of the overlapping sections 101 and the overlapping regions 121. Specifically, the two overlapping regions 121L (221L, 321L) and 121R (221R, 321R) exist by corresponding to the two overlapping sections 101L (201L, 301L) and 101R (201R, 301R) in the aperture part 110 (210, 310).

The overlapping section 101 is determined according to the relation with respect to the aperture parts 210 and 310 neighboring to each other in the first direction x. Thus, the overlapping section 101L and the overlapping section 201R in the first direction x coincide with each other, and the overlapping section 101R and the overlapping section 301L coincide with each other as well.

The shape of the overlapping region 121 of Example 1 is a right-angled triangle. Further, the two overlapping regions 121L and 121R existing within a single aperture part 110 are in a relation of congruent and line symmetrical with each other. Furthermore, the positions of the two overlapping regions 121L and 121R in the second direction y coincide with each other. In the overlapping regions 121L and 121R, the aperture sides 100A and 100B opposing to the neighboring aperture parts 210 and 310 are not in parallel to each other. This is the same for the overlapping regions 221L, 221R, 321L, 321R and the aperture sides 200A, 200B, 300A, and 300B.

The relations regarding the sums of the longitudinal aperture widths in the overlapping sections are as follows. As shown in FIG. 1A, the overlapping sections 101L and 201R coincide with each other in the first direction x. Further, the sum of the longitudinal aperture width 111L of the overlapping region 121L in the overlapping section 101L and the longitudinal aperture width 211R of the overlapping region 221R in the overlapping section 201R takes a constant value in the first direction x. Similarly, the sum of the longitudinal aperture width 111R and the longitudinal aperture width 311L takes a constant value in the first direction x.

The sums of the longitudinal aperture widths "111L+211W" and "111R+311L" are desirable to be constant in terms of the manufacture stability. However, it is not essential for the sums to take a constant value. As will be referred in the explanation of a plot 001 shown in FIG. 1B, it is sufficient for the sums to be larger than the longitudinal aperture width 113 of the aperture width constant region 123.

The aperture width fluctuating region 122 (222, 322) exists in the aperture width fluctuating section 102 (202, 302). There are two aperture width fluctuating regions 122 (222, 322) in a single aperture part 110 (210, 310). Specifically, two aperture width fluctuating regions 122L (222L, 322L) and 122R (222R, 322R) exist by corresponding to the two aperture width fluctuating sections 102L (202L, 302L) and 102R (202R, 302R) in the first direction of the aperture part 110 (210, 310). The aperture width fluctuating region 122 (222, 322) exists between the overlapping region 121 (221, 321) and the aperture width constant region 123 (223, 323).

In the aperture width fluctuating regions 122 (222, 322), the longitudinal aperture width changes depending on the positions in the first direction x. The longitudinal aperture width continuously increases from the aperture width constant region 123 (223, 323) towards the overlapping region 121 (221, 321), i.e., towards the both-end sides of the aperture part 110 (210, 310). Specifically, the longitudinal aperture width of the aperture width fluctuating region 122L (222L, 322L) becomes the minimum-value longitudinal aperture width 113 (213, 313) at the position in contact with the aperture width constant region 123 (223, 323), becomes the maximum-value longitudinal aperture width 111 (211, 311) at the position in contact with the overlapping region 121 (221, 321), and continuously and linearly increases from the minimum value to the maximum value at the positions between those. Note that the shape of the aperture width fluctuating region 122 (222, 322) in Example 1 is an isosceles trapezoid.

The relation between the positions in the first direction and the longitudinal aperture width in Example 1 is shown by the plot 001 of FIG. 1B. The longitudinal aperture width is always constant in the aperture width constant section 103 (203, 303). Further, the sums of the longitudinal aperture widths "111L+211W" and "111R+311L" of the overlapping section 101 (201, 301) are always constant and each of those is a larger value than the longitudinal aperture width 113. In the aperture width fluctuating section 102 (202, 302) existing between the aperture width constant section 103 (203, 303) and the overlapping section 101 (201, 301), the longitudinal aperture width changes as the position in the first direction x changes. In Example 1, the shape of the aperture width fluctuating region 122 (222, 322) is an isosceles trapezoid, so that the longitudinal aperture width changes in a linear form. Assuming that the range where the longitudinal aperture width changes in the first direction x is V1, there are the maximum value Wh of the longitudinal aperture width and the minimum value Wl of the longitudinal aperture width generated within the range V1. As described above, it is not essential for the sums of the longitudinal aperture widths to be constant.

First Exemplary Embodiment (Example 2)

Figure 2:
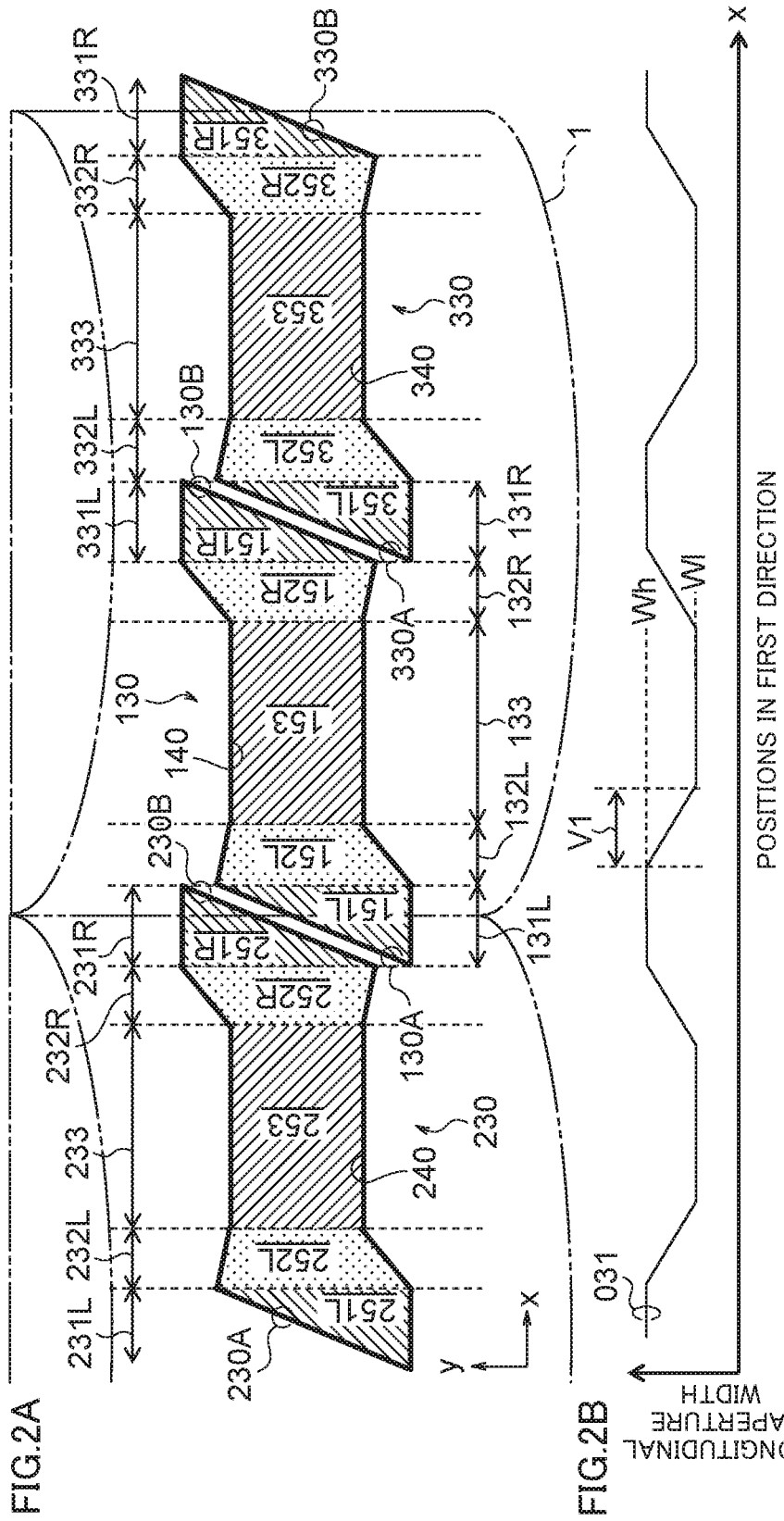
FIG. 2A is a fragmentary elevational view showing the structure of Example 2 of the first exemplary embodiment.
FIG. 2B is a graph showing the relation between positions in the first direction and longitudinal aperture widths in Example 2 of the first exemplary embodiment.

Example 2 of the first exemplary embodiment will be described by referring to FIG. 2A. Sub-pixels 130, 230, and 330 of Example 2 are arranged along the first direction x. The unit lenses of the lens 1 as the light-ray control modules are disposed at the positions corresponding to a pair of sub-pixels 130, 330, and arranged repeatedly along the first direction x.

An aperture part 140 (240, 340) of the sub-pixel 130 (230, 330) of Example 2 has three sections, i.e., an aperture width constant section 133 (233, 333), an overlapping section 131 (231, 331), and an aperture width fluctuating section 132 (232, 332) in the first direction x.

Specifically, one aperture width constant section 133 (233, 333), two aperture width fluctuating sections 132L (232L, 332L), 132R (232R, 332R), and two overlapping sections 131L (231L, 331L), 131R (231R, 331R) exist in a single aperture part 140 (240, 340).

The shape of an aperture width constant region 153 (253, 353) is rectangular like the shape of the aperture width constant region 123 (223, 323) in Example 1 shown in FIG. 1A. A feature of Example 2 is that the position of the aperture width constant region 153 of the aperture part 140 in the second direction y and the positions of the aperture width constant regions 253, 353 of the neighboring aperture parts 240, 340 in the second direction y coincide with each other.

The overlapping regions 151L and 151R of the aperture part 140 are both in a right-angled triangle shape and are in a relation of congruent and rotational symmetric with each other. Further, the overlapping regions of different aperture parts whose positions on the first direction x coincide with each other, e.g., the overlapping region 151L and the overlapping region 251R, are also in a relation of congruent and rotational symmetric with each other. Further, the positions of the two overlapping regions 151L and 151R of the aperture part 140 in the second direction y are shifted from each other. This point is a feature that is different from that of the aperture part 110 of Example 1 shown in FIG. 1A.

Out of the aperture sides which define the shape of the aperture part 140 within the overlapping regions 151L, 151R, the aperture sides 130A, 130B disposed by opposing to the aperture parts 240, 340 neighboring to each other in the first direction x are in parallel to each other. Further, each of the aperture sides 130A and 130B is in parallel to none of the other aperture sides which define the shape of the aperture part 140. From another viewpoint, the aperture sides of the aperture width fluctuating regions 152L, 152R are in parallel to none of the aperture sides in the overlapping regions 151L, 151R. This is the same in the aperture part 110 of Example 1 shown in FIG. 1A. Described above is also the same for the overlapping regions 251L, 251R, 351L, 351R and the aperture sides 230A, 230B, 330A, and 330B.

The shape of the aperture width fluctuating regions 152L and 152R of the aperture part 140 is a trapezoid. The lower bases of those trapezoids are disposed on both sides of the aperture part 140 in the first direction x, respectively. Thereby, the longitudinal aperture width at the positions in the first direction x continuously and linearly increases towards the both-end sides from roughly the center of the aperture part 140 as in the case of Example 1 of FIG. 1A. While the shape of the aperture width fluctuating regions 122L, 122R in Example 1 of FIG. 1A is an isosceles trapezoid, the shape of the aperture width fluctuating regions 152L, 152R in Example 2 is not limited to an isosceles trapezoid. Described above is also the same for the aperture width fluctuating regions 252L, 252R, 352L, and 352R.

In Example 2, there is also a following feature in the layout method of the aperture parts of the sub-pixels. In FIG. 2A, the aperture parts 140, 240, and 340 neighboring to each other in the first direction x are disposed in such a manner that the positions thereof in the second direction y are all become the same. Further, the aperture part 140 and the aperture parts 240, 340 neighboring to that are congruent to each other.

FIG. 2B is a graph showing the relation between the positions in the first direction x and the longitudinal aperture width of Example 2 by a plot 031. In Example 2, the shape of the aperture part of the sub-pixel is different from that of Example 1. However, the same relation as the case of the plot 001 of Example 1 shown in FIG. 1B can be satisfied. Other structures of Example 2 are same as those of Example 1.

First Exemplary Embodiment (Example 3)

Figure 3:
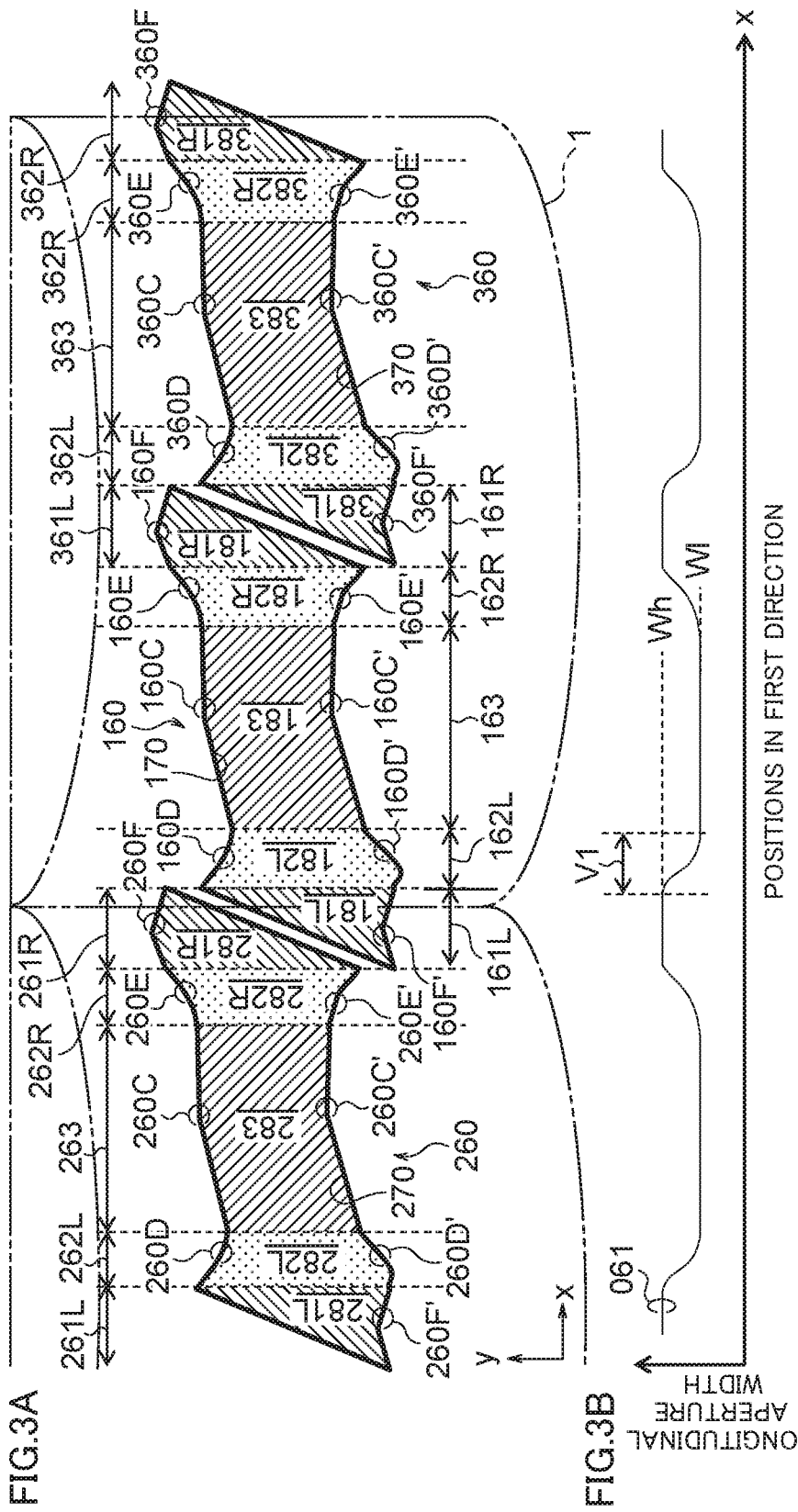
FIG. 3A is a fragmentary elevational view showing the structure of Example 3 of the first exemplary embodiment.
FIG. 3B is a graph showing the relation between positions in the first direction and longitudinal aperture widths in Example 3 of the first exemplary embodiment.

Example 3 of the first exemplary embodiment will be described by referring to FIG. 3A. Sub-pixels 160, 260, and 360 of Example 3 are arranged along the first direction x. The unit lenses of the lens 1 as the light-ray control modules are disposed at the positions corresponding to a pair of sub-pixels 160, 360, and arranged repeatedly along the first direction x.

An aperture part 170 (270, 370) of the sub-pixel 160 (260, 360) of Example 3 has three sections, i.e., an aperture width constant section 163 (263, 363), an overlapping section 161 (261, 361), and an aperture width fluctuating section 162 (262, 362) in the first direction x. Specifically, one aperture width constant section 163 (263, 363), two aperture width fluctuating sections 162L (262L, 362L), 162R (262R, 362R), and two overlapping sections 161L (261L, 361L), 161R (261R, 361R) exist in a single aperture part 170 (270, 370).

In the aperture width constant section 163, the aperture sides 160C and 160C' for defining the shape of the aperture part 170 are both bent. The two aperture sides 160C and 160C' both are in a relation of translation along the second direction y, so that the longitudinal aperture width within the aperture width constant section 163 is maintained constant in the first direction x. This is the same also for the aperture sides 260C, 260C' and the aperture sides 360C, 360C'.

In the overlapping section 161L, the aperture side 160F' for defining the shape of the aperture part 170 is bent. The aperture side 160F' and the aperture side 260F of the overlapping section 261R that is same as the overlapping section 161L are in a relation of translation along the second direction y. This is a relation in which the border line between the aperture part 170 and the aperture part 270 neighboring thereto have a constant width in the first direction x, and the sums of the longitudinal aperture widths in the overlapping sections 161L, 261R become constant in the first direction x. This is the same in the aperture sides 160F, 360F' in the respective same overlapping sections 161R, 361L. Note that it is desirable for the sums of the longitudinal aperture widths in the same overlapping sections 161L, 261R to be constant in the first direction x. However, it is not essential for the sums to be constant as in the case of Example 1. That is, the aperture side 160F' and the aperture side 260F may not have to be in a relation of translation along the second direction y.

In the sub-pixel shown in FIG. 3A, the overlapping region 181L (181R) and the overlapping region 281R (381L) in the same overlapping section 161L (161R) are not congruent with each other. This is because the aperture side 160F' (160F) and the aperture side 260F (360F') are in a relation of translation as described above.

The aperture sides 160D (160E) and 160D' (160E') in the aperture width fluctuating section 162L (162R) for defining the shape of the aperture part 170 are both bent. In this case, the longitudinal aperture width of the aperture width fluctuating region 182L (182R) changes continuously and non-linearly towards the overlapping region 181L (181R) from the aperture width constant region 183.

FIG. 3B is a graph showing the relation between the positions in the first direction x and the longitudinal aperture widths of Example 3 by a plot 061. As in the cases of Examples 1 and 2, the longitudinal aperture width also changes continuously towards the both-end sides of the aperture part in the first direction in Example 3. However, in Example 3, the bent aperture sides described above are used. Thus, it is different from Examples 1 and 2 in respect that the longitudinal aperture width changes non-linearly (curvilinearly) in the range V1 where the longitudinal aperture width changes. Other structures of Example 3 are the same as those of Examples 1 and 2.

First Exemplary Embodiment (Operations and Effects)

Figure 4:
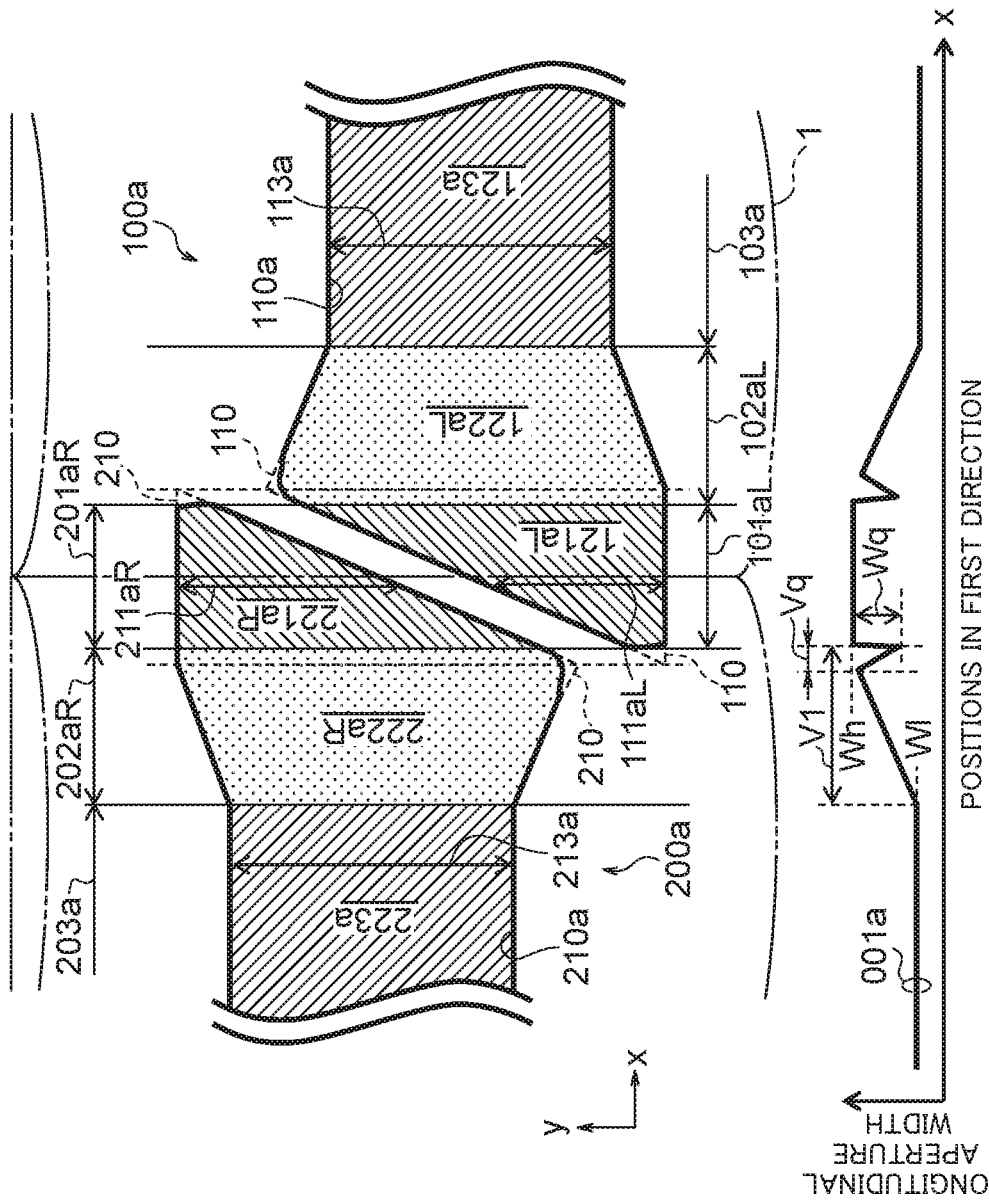
FIG. 4A is a fragmentary elevational view showing a case where corners of the aperture parts of Example 1 of the first exemplary embodiment are rounded.
FIG. 4B is a graph showing the relation between positions in the first direction and longitudinal aperture widths in the case shown in FIG. 4A.

Examples 1 to 3 described above employ the ideal sub-pixel structures. A case where a rounded corner is generated in the aperture part in Example 1 will be described by referring to FIG. 4A. In FIG. 4A, shown are the aperture parts 110, 210 (broken lines) of the ideal sub-pixels shown in FIG. 1A and the aperture parts 110a, 210a of the sub-pixels 100a, 200a with the rounded corners. As in the case of the ideal aperture part 110 (210), there are three sections, i.e., the aperture width constant section 103a (203a), the aperture width fluctuating section 102aL (202aR), and the overlapping section 101aL (201aR) in the aperture part 110a (210a).

Compared to the ideal aperture part 110 (210), the overlapping section 101aL (201aR) in the aperture part 110a (210a) is reduced due to rounding of the corner and, at the same time, the aperture width fluctuating section 102aL (202aR) is expanded for that. FIG. 4B shows the state where the total value of the longitudinal aperture widths changes thereby for the first direction x. In the ideal aperture part 110 (210), the longitudinal aperture width changes continuously from the aperture width fluctuating section to the overlapping section. In the meantime, in the aperture part 110a (210a) with the rounded corner, there is a point at which the longitudinal aperture width becomes radically decreased in the vicinity of the overlapping section 101aL (201aR) within the aperture width fluctuating section 102aL (202aR). Therefore, it is expressed by the plot 001a in which the longitudinal aperture width in the aperture width fluctuating region 122aL (222aR) increases continuously from the aperture width constant region 123a (223a) towards the overlapping region 121aL (221aR), drops by the amount of the longitudinal aperture width change value Wq in the longitudinal aperture width change section Vq in the vicinity of the overlapping region 121aL, and increases again.

The plot 001a shown in FIG. 4B shows the relation of the longitudinal aperture width with respect to the first direction x. As can be seen from that, the longitudinal aperture width change value Wq is generated in the longitudinal aperture width change section Vq due to the rounded corner. However, the longitudinal aperture width change value Wq is a smaller value than Wh−Wl that is the difference between the sum of the longitudinal aperture widths 111aL (211aR), "111aL+211aR", in the overlapping section 101aL (201aR) and the longitudinal aperture width 113a (213a) in the aperture width constant section 123a (223a). That is, a relation of Wq<Wh−Wl applies. The phenomenon shown in FIG. 4A and FIG. 4B is also found in the case where rounded corners are generated in the aperture parts of Example 2 and Example 3.

Figure 5:
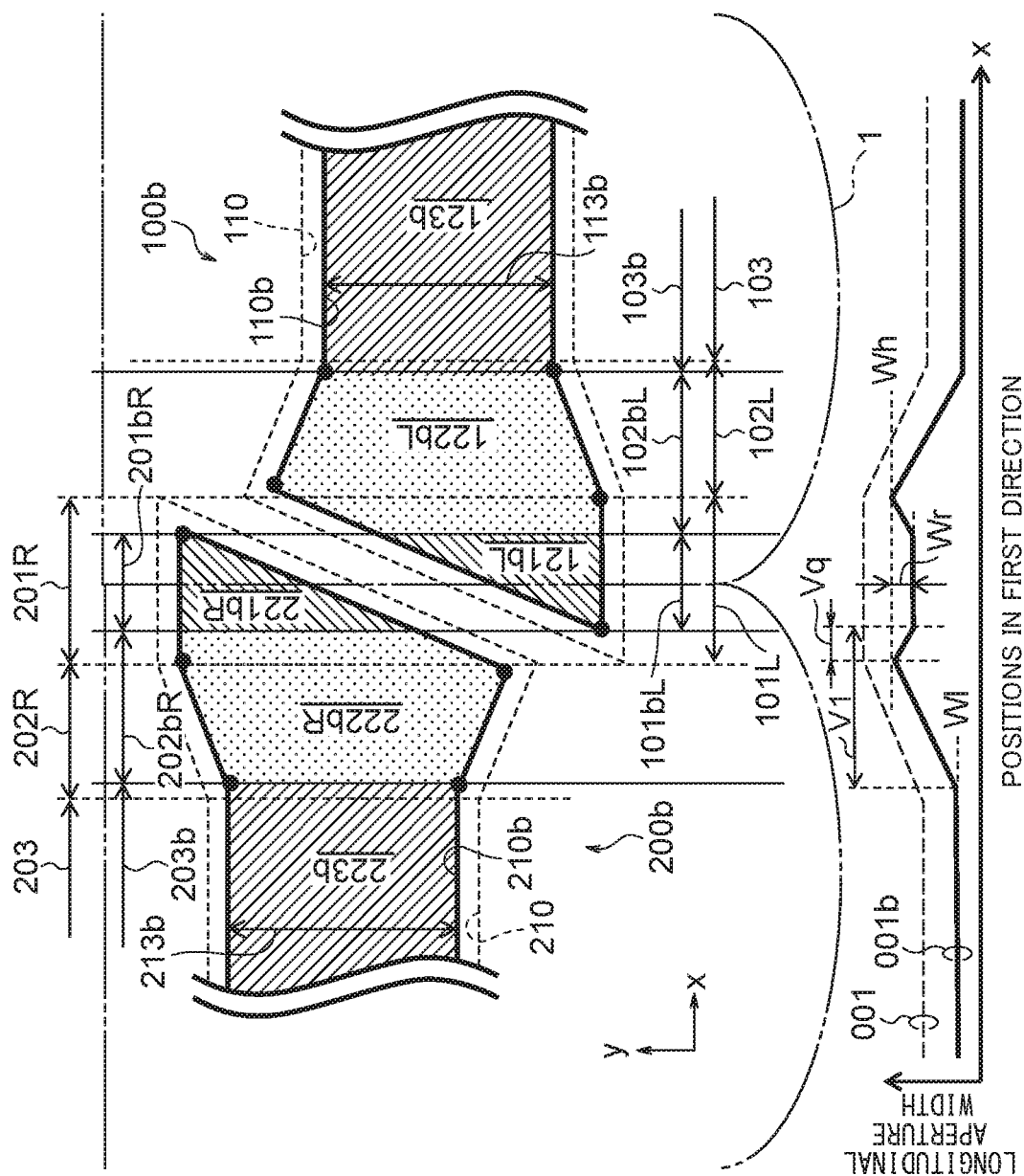
FIG. 5A is a fragmentary elevational view showing a case where overall contraction is generated in the aperture part of Example 1 of the first exemplary embodiment.
FIG. 5B is a graph showing the relation between positions in the first direction and longitudinal aperture widths in the case shown in FIG. 5A.

Further, a case where the aperture part is reduced as a whole due to variation in the processing precision will be described by referring to FIG. 5A. FIG. 5A shows the aperture parts 110, 210 (broken lines) of the ideal sub-pixels shown in FIG. 1A and the aperture parts 110b, 210b of the sub-pixels 100b, 200b reduced as a whole due to variation of the processing precision. As in the case of the ideal aperture part 110 (210), there are three sections, i.e., the aperture width constant section 103b (203b), the aperture width fluctuating section 102bL (202bR), and the overlapping section 101bL (201bR) in the aperture part 110b (210b). The aperture width constant section 103b (203b) corresponds to the aperture width constant region 123b (223b) and the longitudinal aperture width 113b (213b).

Compared to the ideal aperture part 110 (210), in the aperture part 110b (210b), the overlapping section 101bL (201bR) is reduced due to reduction as a whole and, at the same time, the aperture width fluctuating section 102bL (202bR) is expanded for that. FIG. 5B shows the state where the total value of the longitudinal aperture widths changes thereby for the first direction x. Looking at the first direction x from the origin towards the positive direction, in the ideal aperture part 110 (210) shown by the plot 001, the longitudinal aperture width in the aperture width fluctuating section 122bR (222bR) increases continuously from the border line between the aperture width constant section 103 (203) and the aperture width fluctuating section 102L (202R) to the overlapping section 101L (201R) and becomes constant in the overlapping section 101L (201R). In the meantime, in the aperture part 110b (210b) reduced as a whole shown by a plot 001b, the longitudinal aperture widths become decreased uniformly. Thus, the longitudinal aperture width in the aperture width fluctuating section 102bL (202bL) increases continuously from the minimum value Wl to the maximum value Wh and drops by the amount of the longitudinal aperture width change value Wr in the longitudinal aperture width change section Vq in the vicinity of the overlapping region 121bL (221bR). Further, the longitudinal aperture width in the overlapping section 101bL (201bR) also remains decreased for the amount of the longitudinal aperture width change value Wr.

As described, in the plot 001b shown in FIG. 5B, the longitudinal aperture widths in the aperture width fluctuating section 102bL (202bR) and the overlapping section 101bL (201bR) are larger value than the minimum value Wl that is the longitudinal aperture width of the aperture width constant section 103b (203b) as in the case of the plot 001a that is the case of the rounded corner shown in FIG. 4B. The phenomenon shown in FIG. 5A and FIG. 5B is also found in the case where the aperture part is reduced as a whole in Example 2 and Example 3.

FIG. 1A to FIG. 5B will be described roughly. In all the drawings, the longitudinal aperture width in the aperture width constant section located roughly at the center of the aperture part is smaller than the longitudinal aperture widths in the other sections (the sum of the longitudinal aperture widths in the overlapping sections), which is the minimum value Wl. Considering it in terms of the image luminance projected on the observing plane, the image luminance projected at roughly the center of the stereopsis region on the observing plane side is always lower than the image luminance at other observing angles. Thus, when the observing position is shifted from the normal stereoscopic observing position, white moiré is generated at all times.

Figure 6:
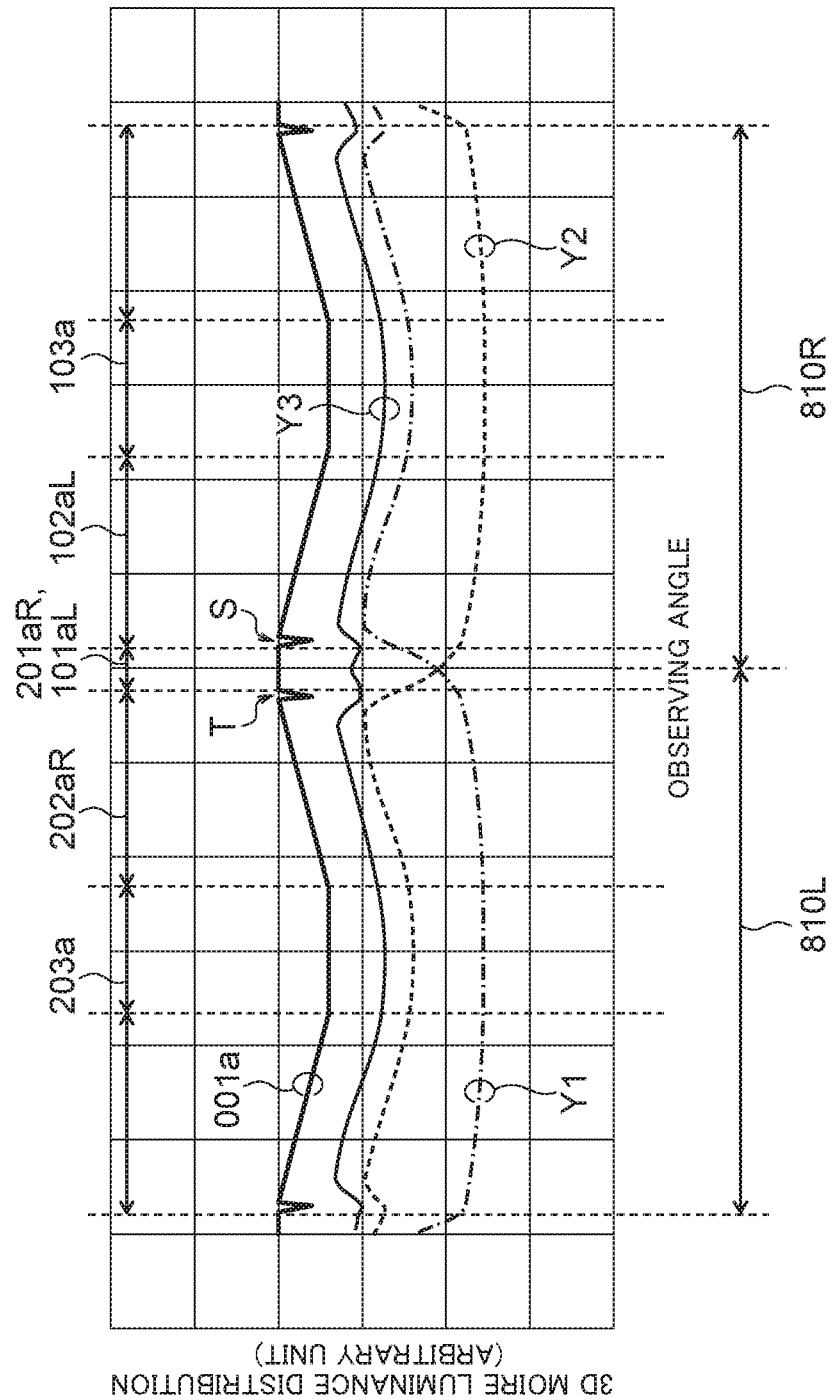
FIG. 6 is a graph showing 3D moiré recognized by an observer in a case where the corner of the aperture part of Example 1 of the first exemplary embodiment is rounded.

More specifically, it can be described as follows. FIG. 6 shows an image of 3D moiré in the state of FIG. 4B. The lateral axis of FIG. 6 is the observing angles from the position along the first direction, and the longitudinal axis is the luminance distribution for the observing angles. Dotted lines show the luminance distributions when an image is outputted to only one of the pixels in a case where a sub-pixel 100 is defined as the right-eye pixel and a sub-pixel 300 is defined as the left-eye pixel. The luminance distribution Y1 is presented in a case where white is displayed on the right-eye pixel and black is displayed on the left-eye pixel, the luminance distribution Y2 is presented in a case where black is displayed on the right-eye pixel and white is displayed on the left-eye pixel, and the luminance distribution Y3 is presented in a case where white is displayed on the both pixels. Basically, the relation regarding the luminance can be expressed as Y3=Y1+Y2. In FIG. 6, the plot 001a shown in FIG. 4B is also shown in a superimposed manner.

Note here that the right-eye observing region is 810R, and the left-eye observing region is 810L. As shown in FIG. 6, Wh−Wl>Wq described above applies even in a case where both eyes of the observer are located in the vicinity of the borders (e.g., positions T, S) of each of the observing regions. Thereby, black moiré can be suppressed.

Further, the expression "continuously changes" regarding the change in the longitudinal aperture width in the aperture width fluctuating region means that a single value of the longitudinal aperture width is decided for the position in a given first direction and the value of the longitudinal aperture width changes without a break for changes in the positions in the first direction. When the longitudinal aperture width changes continuously, the change in the image luminance projected on the observing plane becomes continuous so that a fine stereoscopic display can be achieved. It is desirable for the longitudinal aperture width with respect to the positions in the first direction to change smoothly for the first direction to be able to differentiate. In a case where the rounding of the corners of the aperture part and the overall changes in the aperture part are small, the longitudinal aperture width change section Vq becomes extremely small. Therefore, it is considered that the longitudinal aperture width in FIG. 4B and FIG. 5B also increases continuously from the aperture width constant region 123a (223a) towards the vicinity of the overlapping region 121aL (221aL).

Figure 7B:
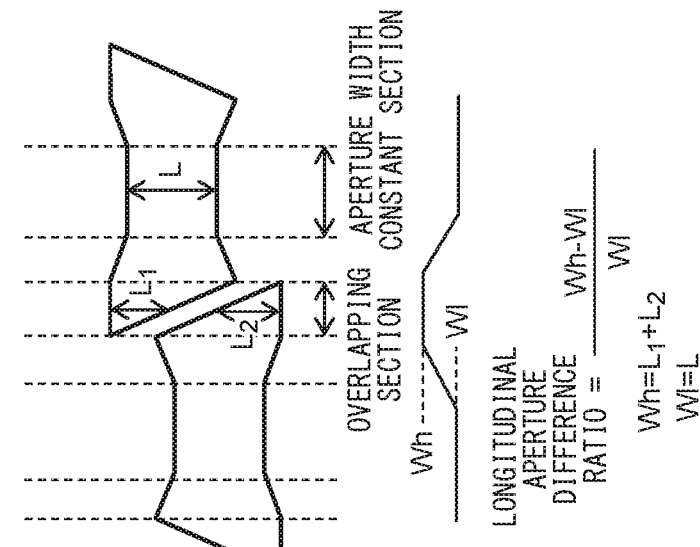
FIG. 7B is an explanatory chart showing the way of calculating the longitudinal aperture difference ratio.
Figure 7A:
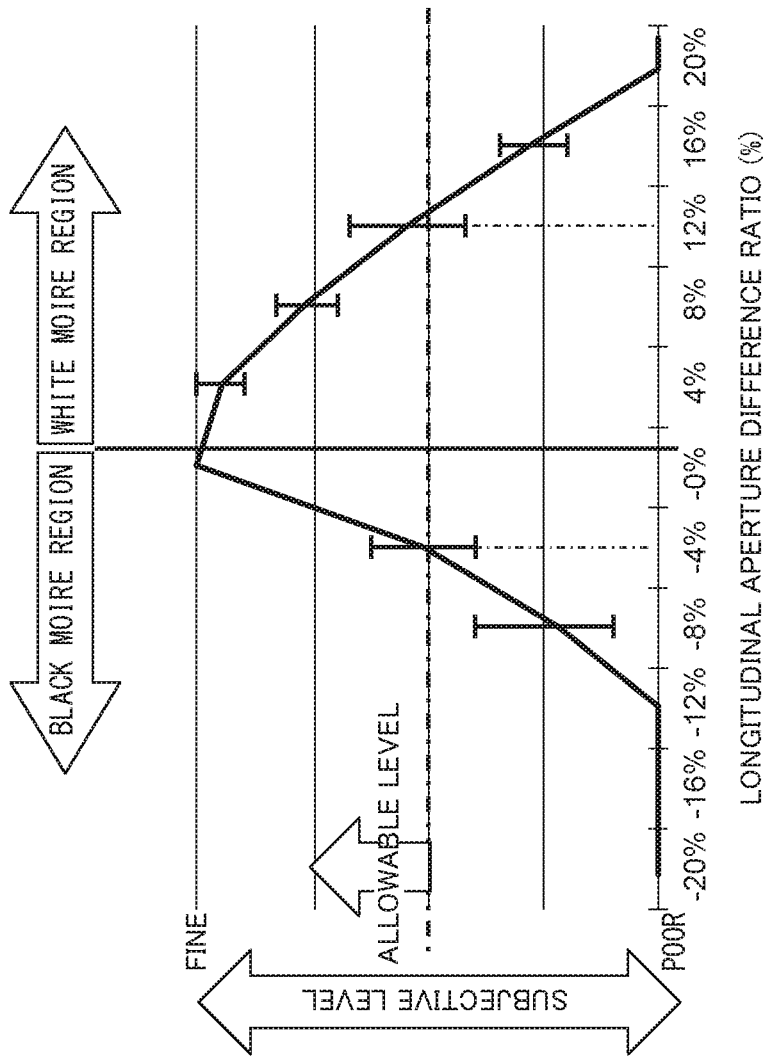
FIG. 7A is a graph showing the subjective evaluation result of 3D moiré.

The stereoscopic display quality perceived by observers was evaluated by using typical evaluation images in a case where white moiré was generated and a case where black moiré was generated when observing stereoscopic display. FIG. 7A and FIG. 7B shows the results thereof. In FIG. 7A, the lateral axis shows the longitudinal aperture difference ratio "(Wh−Wl)/Wl, and the longitudinal axis shows the subjective level. As shown in FIG. 7B, the maximum value Wh is the sum "L1+L2" of the longitudinal aperture widths in the overlapping region, and the minimum value Wl is the longitudinal aperture width L in the aperture width constant region. The subjective levels were set to be in five levels. Score 5 is the best image quality, score 3 is an allowable image quality, and score 1 is the most unacceptable image quality. FIG. 7A shows the average of the scores of ten examinees and the standard deviation. The positive region on the lateral axis shows a region where white moiré is generated, and the negative region shows a region where black moiré is generated. According to the evaluation, it is found that the region of the white moiré has the wider region that is subjectively allowable. Further, it is also found that the subjectively allowable range is the range of −4% to 12% as the value of the longitudinal aperture difference ratio.

From the result shown in FIG. 7A, followings can be said regarding the relation of the sum of the longitudinal aperture width in the aperture width constant region and the longitudinal aperture width in the overlapping region. The allowable range is the range where the value of the longitudinal aperture difference ratio is 12% or less so that it is desirable for the sum of the longitudinal aperture widths in the overlapping region to be in a range of exceeding 1 time and equal to or less than 1.12 times of the longitudinal aperture width of the aperture width constant region for not allowing black moiré.

Further, followings can be said from the results of FIG. 7. In the related techniques, when there is variation in the processing precision generated for the ideal sub-pixel structure, black moiré is generated necessarily. Thus, the subjectively allowable range of the observer is narrow. In the meantime, the first exemplary embodiment is designed to suppress black moiré and intentionally generate white moiré at the same time even when there is variation generated in the processing precision for the ideal sub-pixel structure, so that the allowable range of the observer becomes wider compared to that of the related technique. This makes it possible to achieve a more dominantly fine stereoscopic display property with a naked-eye type stereoscopic display device which employs a display panel having narrow-pitch sub-pixels for achieving high definition and a display panel with a large number of pixels.

Second Exemplary Embodiment

A second exemplary embodiment will be described by referring to FIG. 8A. Sub-pixels 600, 700, and 800 of the second exemplary embodiment are arranged along the first direction x. The unit lenses of the lens 1 as the light-ray control modules are disposed at the positions corresponding to a pair of sub-pixels 600, 800, and arranged repeatedly along the first direction x.

The aperture width constant region existed in the first exemplary embodiment does not exist in the aperture part 610 (710, 810) of the sub-pixel 600 (700, 800) of the second exemplary embodiment. There are two overlapping regions 621L (721L, 821L) and 621R (721R, 821R) in the aperture part 610 (710, 810). Further, there is an aperture width fluctuating region existing between the two overlapping regions. The aperture width fluctuating region is divided into two aperture width fluctuating regions 622L (722L, 822L) and 622R (722R, 822R).

That is, the aperture part 610 includes: the overlapping region 621 (621L, 621R) of the overlapping section 601 (601L, 601R); and the aperture width fluctuating region 622 (622L, 622R) of the aperture width fluctuating section 602 (602L, 602R). The aperture part 710 includes: the overlapping region 721 (721L, 721R) of the overlapping section 701 (701L, 701R); and the aperture width fluctuating region 722 (722L, 722R) of the aperture width fluctuating section 702 (702L, 702R). The aperture part 810 includes: the overlapping region 821 (821L, 821R) of the overlapping section 801 (801L, 801R); and the aperture width fluctuating region 822 (822L, 822R) of the aperture width fluctuating section 802 (802L, 802R). The longitudinal aperture width 611 (611L, 611R) corresponds to the overlapping region 621 (621L, 621R), the longitudinal aperture width 711 (711L, 711R) corresponds to the overlapping region 721 (721L, 721R), and the longitudinal aperture width 811 (811L, 811R) corresponds to the overlapping region 821 (821L, 821R).

Figure 8A:
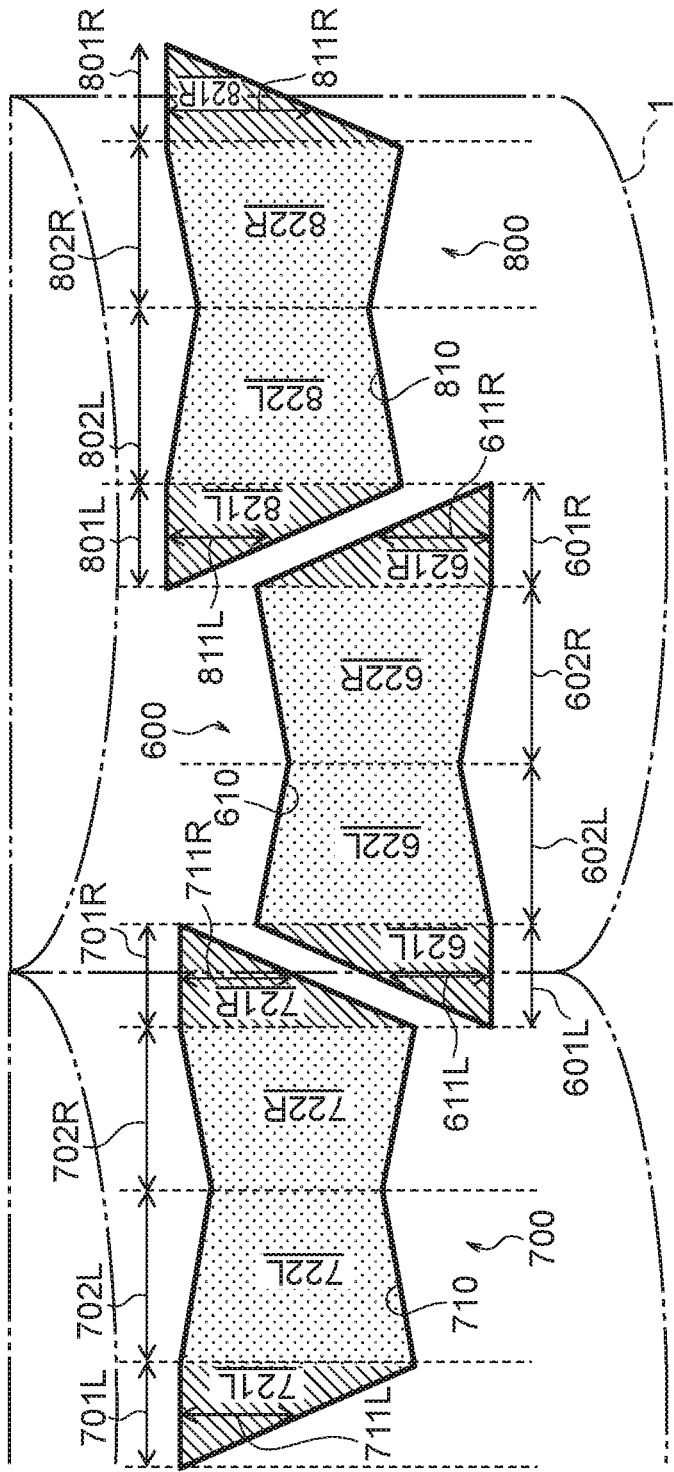
FIG. 8A is a fragmentary elevational view showing the structure of a second exemplary embodiment.
Figure 8B:
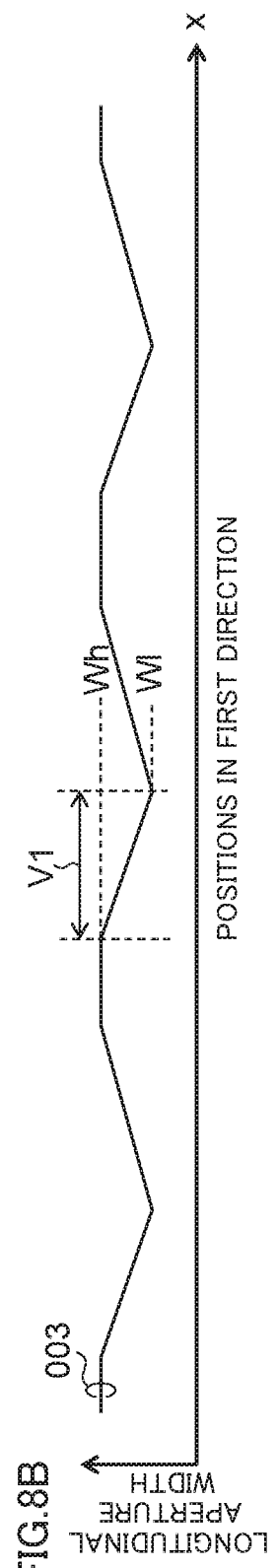
FIG. 8B is a graph showing the relation between positions in a first direction and longitudinal aperture widths according to the second exemplary embodiment.

FIG. 8B shows the relation between the positions in the first direction x and the longitudinal aperture widths in the structure shown in FIG. 8A as a plot 003. Within the range V1 where the longitudinal aperture width changes, the longitudinal aperture width changes continuously and linearly from the minimum value Wl to the maximum value Wh.

FIG. 9A shows the state where the corner is rounded in the ideal sub-pixel structure shown in FIG. 8A in the second exemplary embodiment. The aperture part 610*a* of the sub-pixel 600*a* with the rounded corner includes the overlapping region 621*a*L of the overlapping section 601*a*L, and the aperture width fluctuating region 622*a*L of the aperture width fluctuating section 602*a*L. Similarly, the aperture part 701*a* of the sub-pixel 700*a* with the rounded corner includes the overlapping region 721*a*R of the overlapping section 701*a*R, and the aperture width fluctuating region 722*a*R of the aperture width fluctuating section 702*a*R. The sum of the longitudinal aperture width 611*a*L of the overlapping region 621*a*L and the longitudinal aperture width 711*a*R of the overlapping region 721*a*R is the same at any positions in the first direction x.

FIG. 9B shows the relation between the positions in the first direction x and the longitudinal aperture widths in the structure shown in FIG. 9A as a plot 003*a*. In the second exemplary embodiment, the longitudinal aperture width change value Wq is generated in the longitudinal aperture change section Vq due to the rounding of the corners as in the case of the first exemplary embodiment. However, a relation of Wh−Wl>Wq also applies as in the case of the first exemplary embodiment. Therefore, even when there is variation generated in the processing precision for the ideal sub-pixel structure, since the second exemplary embodiment is also designed to suppress black moiré and intentionally generate white moiré at the same time, so that the allowable range of the observer becomes wider compared to that of the related technique.

As shown in FIG. 8A, the point that none of the aperture sides for defining the shape of the aperture part 610 (710, 810) in the aperture width fluctuating region 622 (722, 822) is not in parallel to the aperture sides for defining the shape of the aperture part 610 (710, 810) in the overlapping region 621 (721, 821) is the same as the case of the first exemplary embodiment. Further, other structures, operations, and effects of the second exemplary embodiment are the same as those of the first exemplary embodiment.

Third Exemplary Embodiment (Comparative Example)

Before describing Examples of a third exemplary embodiment, Comparative Example is first shown in FIG. 10A.

Respective aperture parts 901UL, 901DL, 901UR, and 901DR of sub-pixels 900UL, 900DL, 900UR, and 900DR of Comparative Example are in a same shape as the aperture part of Example 1 of the first exemplary embodiment, and are disposed in a matrix form of 2×2. The unit lenses of the lens 1 as the light-ray control modules are disposed at the positions corresponding to a pair of sub-pixels 900UL (900DL), 900UR (900DR), and arranged repeatedly along the first direction x. FIG. 10B is a graph showing the change in the luminance distribution for the second direction y in the aperture parts 901UL and 901DL as a plot 902L. Similarly, FIG. 10C is a graph showing the change in the luminance distribution for the second direction y in the aperture parts 901UR and 901DR as a plot 902R.

The aperture parts 901UL, 901UR are disposed by being shifted from each other in the second direction y and the aperture parts 901DL, 901DR are disposed by being shifted from each other in the second direction y, so that there is a difference generated in the maximum values of the changes in the luminance distributions in the second direction y between the plot 902L and the plot 902R. The lens 1 cannot distribute the light rays to the second direction y, so that different luminance distributions for the second direction y are projected in that state to the observing plane. As a result, a sense of granularity is to be perceived in the image.

Third Exemplary Embodiment (Example 1)

FIG. 11A shows sub-pixels 910UL, 910DL, 910UR, and 910DR as Example 1 of a third exemplary embodiment. Respective aperture parts 911UL, 911DL, 911UR, and 911DR of the sub-pixels 910UL, 910DL, 910UR, and 910DR are in a shape acquired by expanding the shape of the aperture part of Comparative Example described above in the second direction y, and are disposed in a matrix form of 2×2. The unit lenses of the lens 1 as the light-ray control modules are disposed at the positions corresponding to a pair of sub-pixels 910UL (910DL), 910UR (910DR), and arranged repeatedly along the first direction x. The aperture part 911UR includes the overlapping region 916 (916L, 916R), the aperture width fluctuating region 917 (917L, 917R), and the aperture width constant region 918. The other aperture parts 911UL, 911DL, and 911DR also have the respective overlapping regions, aperture width fluctuating regions, and the aperture width constant regions.

FIG. 11B is a graph showing the change in the luminance distribution for the second direction y in the aperture parts 911UL and 911DL as a plot 912L. Similarly, FIG. 11C is a graph showing the change in the luminance distribution for the second direction y in the aperture parts 911UR and 911DR as a plot 912R. Unlike Comparative Example (FIG. 10B and FIG. 10C), there is almost no difference generated in the maximum values in the changes of the luminance distributions in the second direction y with Example 1. Therefore, with Example 1, the luminance increase/decrease generated at different positions in the viewpoint direction of the observing plane becomes almost the same. As a result, a sense of granularity can be suppressed.

Third Exemplary Embodiment (Example 2)

FIG. 12A shows sub-pixels 920UL, 920DL, 920UR, and 920DR as Example 2 of the third exemplary embodiment. Respective aperture parts 921UL, 921DL, 921UR, and 921DR of the sub-pixels 920UL, 920DL, 920UR, and 920DR are in a shape acquired by expanding a shape different from the aperture part of Example 1 described above in the second direction y, and are disposed in a matrix form of 2×2. The unit lenses of the lens 1 as the light-ray control modules are disposed at the positions corresponding to a pair of sub-pixels 920UL (920DL), 920UR (920DR), and arranged repeatedly along the first direction x. The aperture part 921UR includes the overlapping region 926 (926L, 926R), the aperture width fluctuating region 927 (927L, 927R), and the aperture width constant region 928. The other aperture parts 921UL, 921DL, and 921DR also have the respective overlapping regions, aperture width fluctuating regions, and the aperture width constant regions.

FIG. 12B is a graph showing the change in the luminance distribution for the second direction y in the aperture parts 921UL and 921DL as a plot 922L. Similarly, FIG. 12C is a graph showing the change in the luminance distribution for the second direction y in the aperture parts 921UR and 921DR as a plot 922R. Unlike Comparative Example (FIG. 10B and FIG. 10C), there is almost no difference generated in the maximum values in the changes of the luminance distributions in the second direction y with Example 2. Therefore, with Example 2, the luminance increase/decrease generated at different positions in the viewpoint direction of the observing plane becomes almost the same. As a result, a sense of granularity can be suppressed.

Third Exemplary Embodiment (Summary)

Note here that the distance between the maximum value and the minimum value of the aperture position in the second direction of a single sub-pixel is defined as an optical longitudinal aperture section. That is, the maximum value of the difference between the position at one end of the aperture part in the second direction and the position at the other end of the aperture part in the second direction is defined as "longitudinal aperture section". In the aperture part 901UL of Comparative Example shown in FIG. 10A, the difference between the position at one end 904 in the second direction y and the position at the other end 905 in the second direction y is the longitudinal aperture section 903. In the aperture part 911UL of Example 1 shown in FIG. 11A, the difference between the position at one end 914 in the second direction y and the position at the other end 915 in the second direction y is the longitudinal aperture section 913. In the aperture part 921UL of Example 2 shown in FIG. 12A, the difference between the position at one end 924 in the second direction y and the position at the other end 925 in the second direction y is the longitudinal aperture section 923. Further, as in the cases of the first and second exemplary embodiments, the width of the aperture part in the longitudinal direction is defined as "longitudinal aperture width".

The sub-pixel according to the third exemplary embodiment has following features. In Comparative Example shown in FIG. 10A, the value of the longitudinal aperture section 903 and the value of the largest longitudinal aperture width among the longitudinal aperture widths at arbitrary positions in the first direction x are the same. In the meantime, in Example 1 shown in FIG. 11A, the value of the longitudinal aperture section 913 is larger than the value of the largest longitudinal aperture width among the longitudinal aperture widths at arbitrary positions in the first direction x, and the positions of the longitudinal aperture sections 913 in the second direction y coincide with each other between the longitudinal aperture sections neighboring to each other in the first direction x. Similarly, in Example 2 shown in FIG. 12A, the value of the longitudinal aperture section 923 is larger than the value of the largest longitudinal aperture width among the longitudinal aperture widths at arbitrary positions in the first direction x, and the positions of the longitudinal aperture sections 923 in the second direction y coincide with each other between the longitudinal aperture sections neighboring to each other in the first direction x. This makes it possible with the third exemplary embodiment to suppress a sense of granularity perceived in images on the observing plane.

The third exemplary embodiment can also be expressed as follows. In Example 1 shown in FIG. 11A, the difference between the position at one end of the aperture part 911UL in the second direction y and the position at the other end of the aperture part 911UL in the second direction y becomes the maximum between the one end 914 and the other end 915. The region of the maximum value is defined as the longitudinal aperture section 913. In that case, the longitudinal aperture section 913 takes the value larger than the maximum value of the longitudinal aperture width of the aperture part 911UL. Further, the positions of one end 914 and the other end 915 in the second direction y constituting the longitudinal aperture section 913 are the same in the aperture parts 911UL and 911UR which are neighboring to each other in the first direction x. This is the same in Example 2 shown in FIG. 12A.

In the cases of the aperture parts shown in FIG. 2A, FIG. 3A, and FIG. 8A, the third exemplary embodiment can also be employed in the same manner. Further, the point that none of the aperture sides for defining the shape of the aperture part 911UR (921UR) in the aperture width fluctuating region 917 (927) is in parallel to the aperture sides for defining the shape of the aperture part 911UR (921UR) in the overlapping region 916 (926) is the same as the cases of the first and second exemplary embodiment. Further, other structures, operations, and effects of the third exemplary embodiment are same as those of the first and second exemplary embodiments.

Fourth Exemplary Embodiment (Example 1)

Figures 19A, 19B:
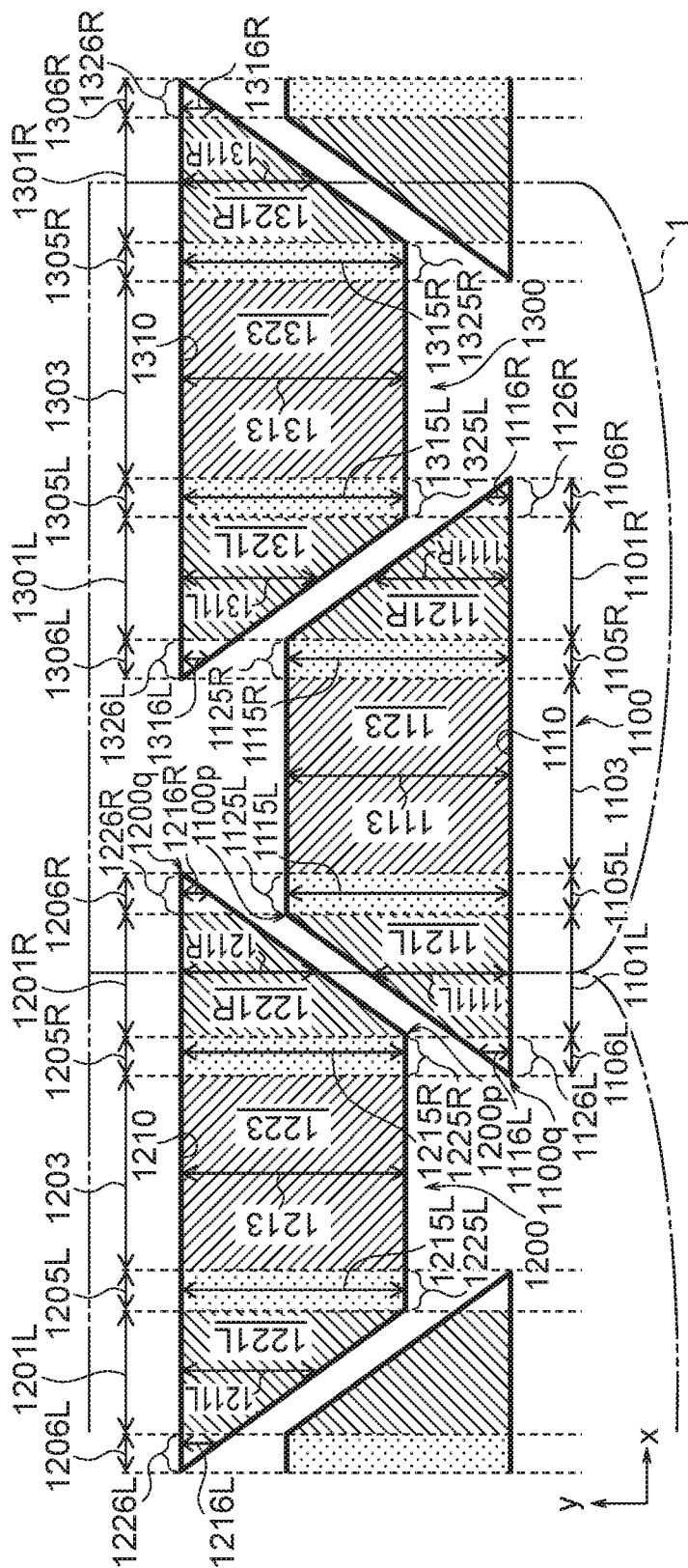
FIG. 19A is a fragmentary elevational view showing the structure of Example 1 of a fourth exemplary embodiment.
FIG. 19B is a graph showing the relation between positions in the first direction and longitudinal aperture widths in Example 1 of the fourth exemplary embodiment.

Example 1 of a fourth exemplary embodiment will be described by referring to FIG. 19A and FIG. 19B. FIG. 19A shows three sub-pixels 1100, 1200, and 1300 disposed in parallel in the first direction x among a great number of sub-pixels arranged in matrix. That is, the sub-pixels 1100, 1200, and 1300 according to Example 1 are arranged along the first direction x. The unit lenses of the lens 1 as the light-ray control modules are disposed at the positions corresponding to a pair of sub-pixels 1100, 1300, and such structure is arranged repeatedly along the first direction x. Thus, the first direction x is roughly in parallel to the viewpoint direction of the observer that is the light-ray separating direction. Further, the aperture shape of the three sub-pixels 1100, 1200, and 1300 is an isosceles trapezoid, and those neighboring to each other are disposed by shifting the positions thereof in the second direction and in a rotationally symmetrical manner by 180 degrees.

Each of the aperture parts 1110 (1210, 1310) of the two sub-pixels 1100 (1200, 1300) neighboring to each other in the first direction x includes: an overlapping region A1121 (1221, 1321), an overlapping region B1125 (1225, 1325), and an overlapping region C1126 (1226, 1326) which overlap with each other in the second direction y; and an aperture width constant region 1123 (1223, 1323) which does not overlap with each other (a non-overlapping region). The overlapping regions are generated by overlap of the neighboring sub-pixels in the first direction x, so that there are one each of those regions existing at both ends within a single sub-pixel. The overlapping regions B and C are the longitudinal aperture width sum fluctuating regions. In the non-overlapping region, the longitudinal aperture width 1113 (1213, 1313) is always constant regardless of the positions in the first direction x. In this respect, Example 1 is different from the first and second exemplary embodiments.

Each of the sections in the first direction x is as follows. The overlapping sections A1101L, 1101R of the sub-pixel 1100 are the same sections with the overlapping section A1201R of the sub-pixel 1200 and the overlapping section A1301L of the sub-pixel 1300, respectively. Further, the overlapping sections B1105L, 1105R of the sub-pixel 1100 correspond to the overlapping section C1206R of the sub-pixel 1200 and the overlapping section C1306L of the sub-pixel 1300, and the overlapping sections C1106L, 1106R of the sub-pixel 1100 correspond to the overlapping section B1205R of the sub-pixel 1200 and the overlapping section B1305L of the sub-pixel 1300. Each of the sub-pixels in those sections overlaps with each other in the second direction y and form the overlapping regions A, B, and C.

The sums of the longitudinal aperture width and the longitudinal aperture width are as follows. The sum of the longitudinal aperture widths of the overlapping section A1101L (1201R) of the sub-pixel 1100, "1111L+1211R", is constant regardless of the positions in the first direction x. In the meantime, the sum of the longitudinal aperture widths of the overlapping section B1105L (1206R) of the sub-pixel 1100, "1115L+1216R", and the sum of the longitudinal aperture widths of the overlapping section C1106L (1205R) of the sub-pixel 1100, "1116L+1215R", fluctuate depending on the positions in the first direction x. This is because the longitudinal aperture width 1216R of the sub-pixel 1200 fluctuates in the overlapping section B1105L depending on the positions in the first direction x, and the longitudinal aperture width 1116L of the sub-pixel 1100 fluctuates in the overlapping section C1106L depending on the positions in the first direction x. Similarly, in the overlapping section A1101R, the overlapping section B1105R, and the overlapping section C1106R of the sub-pixel 1100, the sum of the longitudinal aperture widths "1111R+1311L" is constant regardless of the positions in the first direction x, while the sums of the longitudinal aperture widths "1115R+1316L" and "1116R+1315L" fluctuate depending on the positions in the first direction x. The longitudinal aperture width 1113 of the aperture width constant section 1103 of the sub-pixel 1100 is constant regardless of the positions in the first direction x. Further, the other sub-pixels 1200 and 1300 have the relations similar to the case of the sub-pixel 1100.

The relations regarding the values of the sums of the longitudinal aperture widths are as follows. The sum of the longitudinal aperture widths of the overlapping section A1101L of the sub-pixel 1100, "1111L+1211R", the sum of the longitudinal widths of the overlapping section B1105L, "1115L+1216R" and the sum of the longitudinal widths of the overlapping section C1106L, "1116L+1215R", are larger than the longitudinal aperture width "1113" of the aperture width constant section 1103 regardless of the positions in the first direction x. Such relations are the same also for the sum of the longitudinal aperture widths of the overlapping section A1101R of the sub-pixel 1100, "1111R+1311L", the sum of the longitudinal widths of the overlapping section B1105R, "1115R+1316L" and the sum of the longitudinal widths of the overlapping section C1106R, "1116R+1315L". Further, the other sub-pixels 1200 and 1300 also have the relations similar to the case of the sub-pixel 1100.

The difference of Example 1 with respect to the first and second exemplary embodiments is as follows. As in the cases of the first and second exemplary embodiments, the sub-pixel in Example 1 has an overlapping section that is overlapped in the second direction y for the sub-pixel neighboring thereto in the first direction x. In the first and second exemplary embodiment, the sum of the longitudinal aperture widths in the overlapping section is constant regardless of the positions in the first direction x. In the meantime, in Example 1, the overlapping section is divided into three sections A, B, and C, the sum of the longitudinal aperture widths is constant only in the overlapping section A that is roughly in the center of the overlapping section, and the sum of the longitudinal aperture widths fluctuates in the overlapping sections B and C existing at both ends of the overlapping section A. This is because the opposing aperture sides of the sub-pixel 1100 and the neighboring sub-pixel 1200 are disposed by being shifted in the first direction x. Specifically, a corner part 1100p of the sub-pixel 1100 and a corner part 1200q of the sub-pixel 1200 are shifted in the first direction x. Similarly, a corner part 1100q of the sub-pixel 1100 and a corner part 1200p of the sub-pixel 1200 are shifted in the first direction x.

In those overlapping sections B and C, the sum of the longitudinal aperture widths changes continuously and linearly. This is the same behavior as that of the longitudinal aperture widths in the aperture width fluctuating sections of the first and second exemplary embodiments.

The relation between the positions in the first direction x and the longitudinal aperture widths in Example 1 is shown by a plot 041 in FIG. 19B. In the aperture width constant section 1103 (1203, 1303), the longitudinal aperture width is always constant. Further, the sum of the longitudinal aperture widths in the overlapping section A1101 (1201, 1301) is always constant regardless of the positions in the first direction x, and it is a larger value than the longitudinal aperture width in the aperture width constant section 1103 (1203, 1303). In the overlapping section B1105 existing between the aperture width constant section 1103 and the overlapping section A1101, the sum of the longitudinal aperture widths changes as the position in the first direction x changes. The change in the sum of the longitudinal aperture width is linear. It is because the shapes of the overlapping regions C1226R and 1326L of the sub-pixels 1200 and 1300 neighboring to the sub-pixel 1100 are in a right-angled triangle shape in Example 1. Provided that the range where the longitudinal aperture width changes in the first direction x is V1, there are the maximum value Wh of the longitudinal aperture width and the minimum value Wl of the longitudinal aperture width. As in the case of the first exemplary embodiment, the sum of the longitudinal aperture widths does not necessarily have to be constant in Example 1.

Example 1 can also be expressed as follows. The overlapping regions A, B, and C include two longitudinal aperture width sum fluctuating regions (i.e., the overlapping regions B, C) where the sum of the longitudinal aperture widths with the two neighboring sub-pixels at the same position in the first direction x continuously change, respectively, from roughly the center of the overlapping regions A, B, and C towards the both ends in the first direction x. The sum of the longitudinal aperture width with the two neighboring sub-pixels in the overlapping regions A, B, and C is larger than the longitudinal aperture width in roughly the center of the aperture part.

With Example 1, the similar effects as those of the first exemplary embodiment can be acquired. That is, even in a case where the aperture part is reduced as a whole and a case where the corner is rounded, white moiré is generated as in the case of the first exemplary embodiment so that a fine stereoscopic display property can be achieved. Furthermore, unlike the cases of the first and second exemplary embodiments, the positions of the corner of the aperture part of the sub-pixel and that of the aperture part of the neighboring sub-pixel are different in the first direction in Example 1. Thus, the change in the sum of the longitudinal aperture widths when the corner is rounded is smaller than the cases of the first and second exemplary embodiments. That is, in the case of FIG. 4B, for example, the longitudinal aperture width change value Wq becomes still smaller. As described above, this is because the opposing aperture sides of the sub-pixel and the neighboring sub-pixel are disposed by being shifted in the first direction.

Further, particularly the shape and the size of the corner of the aperture part among the sub-pixel shape is susceptible to manufacture variation. In the sub-pixel shape of Example 1, there are a smaller number of the corners compared to those of the first and second exemplary embodiments. Thus, with Example 1, the precision when manufacturing the sub-pixel shapes can be improved.

Fourth Exemplary Embodiment (Example 2)

Example 2 of the fourth exemplary embodiment will be described by referring to FIG. 20A and FIG. 20B. As shown in FIG. 20A, in Example 2, sub-pixels 2200 and 2300 are disposed by neighboring to a sub-pixel 2100 in the first direction x. The unit lenses of the lens 1 as the light-ray control modules are disposed at the positions corresponding to the sub-pixel 2100 and the neighboring sub-pixel 2300, and such structure is arranged repeatedly along the first direction x. Unlike Example 1 of the fourth exemplary embodiment, the positions of the sub-pixel 2100 and the neighboring sub-pixels 2200, 2300 in the second direction y coincide with each other in Example 2.

As in the case of Example 1 of the fourth exemplary embodiment, in Example 2, each of the aperture parts 2110 (2210, 2310) of the two sub-pixels 2100 (2200, 2300) neighboring to each other in the first direction x includes: an overlapping region A2121 (2221, 2321), an overlapping region B2125 (2225, 2325), and an overlapping region C2126 (2226, 2326) which overlap with each other in the second direction y; and an aperture width constant region 2123 (2223, 2323) which does not overlap with each other (a non-overlapping region). The overlapping regions B and C are the longitudinal aperture width sum fluctuating regions. In the non-overlapping region, the longitudinal aperture width 2113 (2213, 2313) is always constant regardless of the positions in the first direction x. In this respect, Example 2 is different from the first and second exemplary embodiments. The sum of the longitudinal aperture widths of the overlapping section A2101L of the sub-pixel 2100, "2111L+2211R", the sum of the longitudinal aperture widths of the overlapping section B2105L, "2115L+2216R", and the sum of the longitudinal aperture widths of the overlapping section C2106L, "2116L+2215R", are larger than the longitudinal aperture width 2113 of the aperture width constant section 2103, respectively. Similarly, the sum of the longitudinal aperture widths of the overlapping section A2101R, "2111R+2311L", the sum of the longitudinal aperture widths of the overlapping section B2105R, "2115R+2316L", and the sum of the longitudinal aperture widths of the overlapping section C2106R, "2116R+2315L", are larger than the longitudinal aperture width 2113 of the aperture width constant section 2103, respectively.

In Example 2, the opposing aperture sides of the sub-pixel 2100 and the neighboring sub-pixel 2200 are also disposed by being shifted in the first direction x. Specifically, the corner part 2100*p* of the sub-pixel 2100 and the corner part 2200*q* of the sub-pixel 2200 are shifted in the first direction x. Similarly, the corner part 2100*q* of the sub-pixel 2100 and the corner part 2200*p* of the sub-pixel 2200 are shifted in the first direction x. Other structures of Example 2 are same as those of Example 1 of the fourth exemplary embodiment.

The relation between the positions in the first direction x and the longitudinal aperture widths (sum of the longitudinal aperture widths) in Example 2 is shown by a plot 042 in FIG. 20B. Provided that the range where the longitudinal aperture width changes in the first direction x is V1 as in the case of Example 1 of the fourth exemplary embodiment, there are the maximum value Wh of the longitudinal aperture width and the minimum value Wl of the longitudinal aperture width in the range V1. Thus, it is possible with Example 2 to achieve similar effects as the case of Example 1 of the fourth exemplary embodiment. Other structures, operations, and effects of the fourth exemplary embodiment are same as those of the first to third exemplary embodiments.

Fifth Exemplary Embodiment (Example 1)

Figures 21A, 21B:
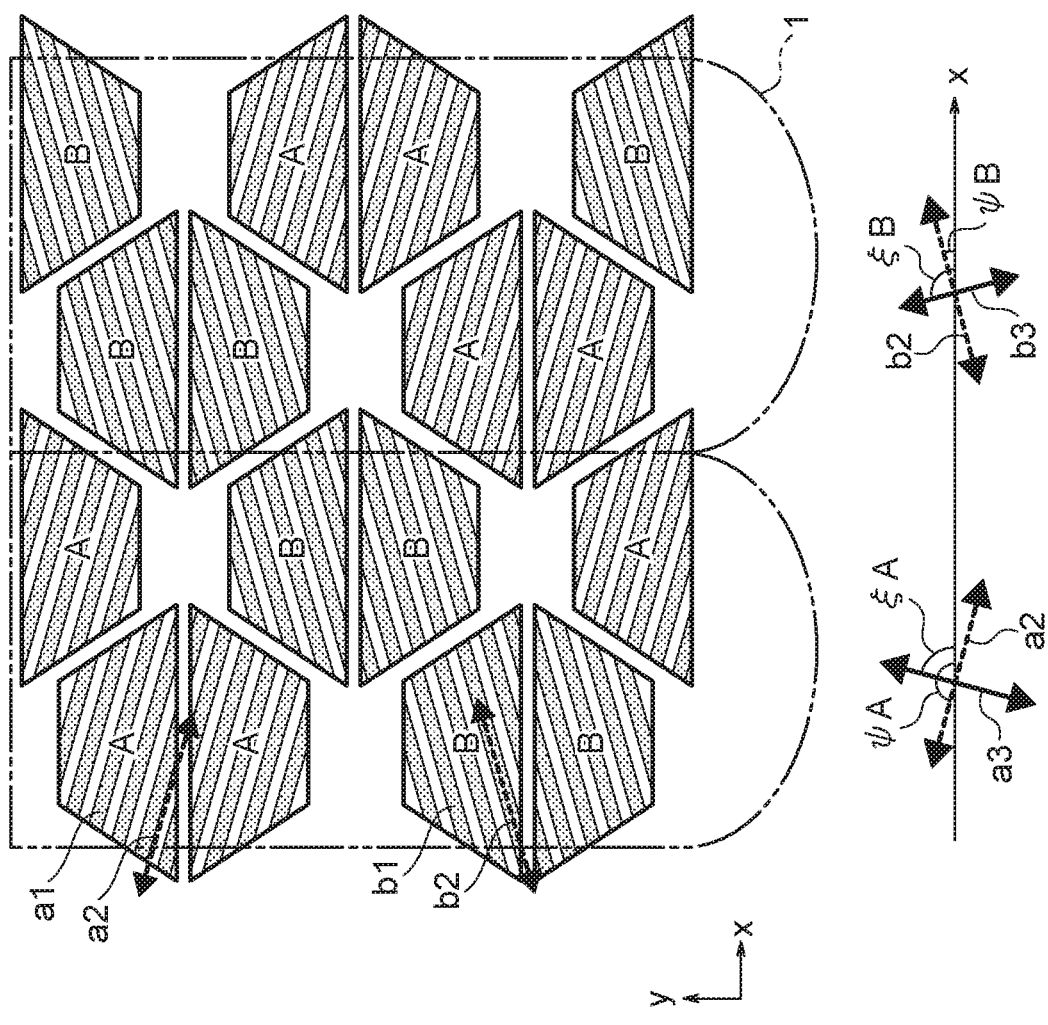
FIG. 21A is a fragmentary elevational view showing the structure of Example 1 of a fifth exemplary embodiment.
FIG. 21B is a schematic chart showing initial alignment directions of liquid crystal in sub-pixels of FIG. 21A, the electrode long-side directions, and the electric field directions.

Even though the shapes of sub-pixels vary in each of Examples of a fifth exemplary embodiment, those are referred to as the sub-pixels A and B for simplifying the explanation. Example 1 of the fifth exemplary embodiment will be described by referring to FIG. 21A and FIG. 21B. The sub-pixels in FIG. 21A are shown by schematically illustrating the aperture shape of the fourth exemplary embodiment (Example 1), and pixel electrodes or common electrodes in a lateral electric field type liquid crystal display device. The aperture shape of the sub-pixel is an isosceles trapezoid as in the case of the fourth exemplary embodiment (Example 1), and the neighboring sub-pixels have the aperture shapes that are rotationally symmetrical at 180 degrees. Such sub-pixels are alternately arranged in the first direction x. Further, the sub-pixels neighboring to each other in the second direction y also have the aperture shapes that are rotationally symmetrical at 180 degrees, and such sub-pixels are alternately arranged.

In FIG. 21A and FIG. 21B, there are sub-pixels A in which a long-side direction a2 of an electrode a1 forms an angle $\psi$A with respect to the initial alignment direction (first direction x) of the liquid crystal and sub-pixels B in which a long-side direction b2 of an electrode b1 forms an angle $\psi$B with respect to the initial alignment direction (first direction x) of the liquid crystal. Because it is the lateral electric field type, an electric field direction a3 applied to the sub-pixel A forms an angle $\xi$A with respect to the initial alignment direction (first direction x) of the liquid crystal, and an electric field direction b3 applied to the sub-pixel B forms an angle $\xi$B with respect to the initial alignment direction (first direction x) of the liquid crystal. The long-side direction a2 is orthogonal to the electric field direction a3, and the long-side direction b2 is orthogonal to the electric field direction b3. Two sub-pixels A are placed along the first direction x and two sub-pixels B are placed neighboring to those. Thereby, the sub-pixels A and the sub-pixels B are arranged at a cycle of two sub-pixels. Similarly, along the second direction y, the sub-pixels A and the sub-pixels B are arranged at a cycle of two sub-pixels. Particularly, the long sides of the isosceles trapezoids of the two sub-pixels A (or two sub-pixels B) neighboring along the second direction y oppose to each other, and have a same electrode angle.

Example 1 can also be expressed as follows. The sub-pixels A and B are lateral-field drive type liquid crystal display devices, and each of those includes striped electrodes a1 and b1 within the aperture part. The angle $\psi$A between the long-side direction a2 of the electrode a1 of the sub-pixel A and the liquid crystal initial alignment (first direction x) is different from the angle $\psi$B between the long-side direction b2 of the electrode b1 of the sub-pixel B that is for the same viewpoint with the sub-pixel A and neighboring thereto in the first direction x and the liquid crystal initial alignment (first direction x).

Figure 22A:
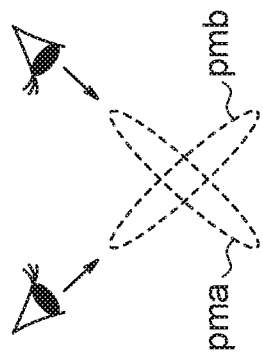
FIG. 22A is a schematic chart showing the relation between initial alignment direction of the positive liquid crystal and an electrode of a sub-pixel A according to the fifth exemplary embodiment.
Figure 22B:
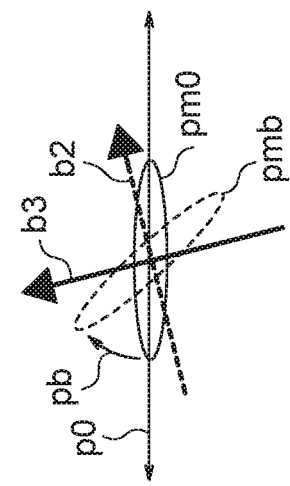
FIG. 22B is a schematic chart showing the relation between initial alignment direction of the positive liquid crystal and an electrode of a sub-pixel B according to the fifth exemplary embodiment.
Figure 22C:
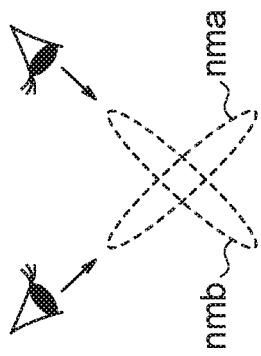
FIG. 22C is a schematic chart showing liquid crystal molecules after a voltage is applied when positive liquid crystal is used in the fifth exemplary embodiment.

The relation between the initial alignment of positive liquid crystal ($\varepsilon$//$-\varepsilon\perp$>0) and electrodes is schematically shown in FIG. 22A and FIG. 22B. In the drawings, the initial alignment direction is in parallel to the first direction x. A voltage is applied to the sub-pixel A in such a manner that the electric field direction a3 is at the angle $\xi$A, and a voltage supplied to the sub-pixel B in such a manner that the electric field direction b3 is at the angle $\xi$B (FIG. 21B). Thus, when the voltage is applied, liquid molecules pm0 in the sub-pixel A rotate counterclockwise from the initial alignment with respect to the substrate plane (arrow pa), while liquid molecules pm0 in the sub-pixel B rotate clockwise from the initial alignment with respect to the substrate plane (arrow pb). Therefore, as shown in FIG. 22C, when observed from a certain angle in the case where the sub-pixels A and the sub-pixel B are arranged periodically, the display is to be observed from both the major axis direction of the liquid crystal molecule pma (liquid crystal molecules pmb) of the sub-pixel A (sub-pixel B) and the minor axis direction of the liquid crystal molecule pmb (liquid crystal molecule pma) of the sub-pixel B (sub-pixel A).

Figure 22D:
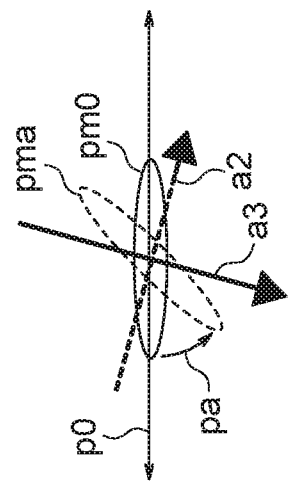
FIG. 22D is a schematic chart showing the relation between initial alignment direction of the negative liquid crystal and an electrode of the sub-pixel A according to the fifth exemplary embodiment.
Figure 22E:
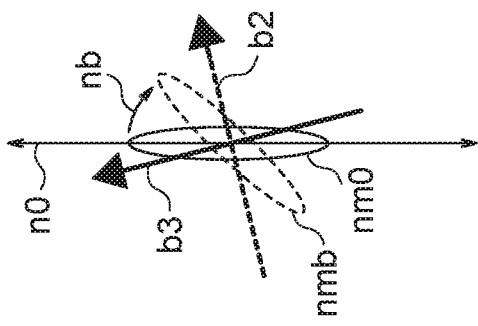
FIG. 22E is a schematic chart showing the relation between initial alignment direction of the negative liquid crystal and an electrode of the sub-pixel B according to the fifth exemplary embodiment.
Figure 22F:
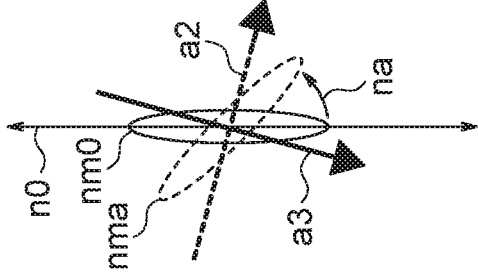
FIG. 22F is a schematic chart showing liquid crystal molecules after a voltage is applied when the negative liquid crystal is used in the fifth exemplary embodiment.

The relation between the initial alignment of negative liquid crystal ($\varepsilon$//$-\varepsilon\perp$<0) and electrodes is schematically shown in FIG. 22D and FIG. 22E. In the drawings, the initial alignment direction is in parallel to the second direction y. A voltage is applied to the sub-pixel A in such a manner that the electric field direction becomes $\xi$A, and the liquid crystal molecules nm0 rotate counterclockwise from the initial alignment with respect to the substrate plane (arrow na). A voltage is applied to the sub-pixel B in such a manner that the electric field direction becomes U3, and the liquid crystal molecules nm0 rotate clockwise from the initial alignment with respect to the substrate plane (arrow nb). Therefore, as shown in FIG. 22F, when observed from a certain angle in the case where the sub-pixels A and the sub-pixel B are arranged periodically, the display is to be observed from both the major axis direction of the liquid crystal molecule nma (liquid crystal molecules nmb) of the sub-pixel A (the sub-pixel B) and the minor axis direction of the liquid crystal molecule nmb (liquid crystal molecule nma) of the sub-pixel B (the sub-pixel A).

Considering a liquid crystal molecule as a refractive index ellipsoid, when viewing from the viewing field angle of the major axis direction of the liquid crystal with respect to the substrate plane and when viewing the viewing field angle of the minor axis direction in a single domain structure, the molecule is viewed bluish in the major axis direction while it is viewed yellowish in the minor axis direction. Note here that through changing the electrode direction (applied electric field direction) for each sub-pixel, the liquid crystals are rotated in the directions different from each other between the sub-pixel A and the sub-pixel B. Thus, the major axes and the minor axes of the refractive index ellipsoids are simultaneously viewed necessarily at any viewing field angles. When ψA≠ψB, the axes of the refractive index ellipsoids can be viewed from different directions and color compensation can be done. In FIG. 21B, the electrode angle ψA of the sub-pixel A and the electrode angle ψB of the sub-pixel B are in a line symmetric relation form each other (ψA=180°−ψB) with respect to the initial alignment direction of the liquid crystal. Under such relation, when a same electric field is applied to the sub-pixels A and B, the liquid crystals of the sub-pixels A and B rotate in different rotating directions from each other at a same angle. Therefore, a still finer display property can be acquired.

In the case of the naked-eye type stereoscopic display device, there is still a point to be studied further. It is because the emitted light from each sub-pixel has the directivity due to the light-ray control module such as a lens, and there are sub-pixels that cannot be visually recognized from certain viewing field angles.

Example 1 is a case of a matrix of the sub-pixels which display 2-viewpoints, in which the sub-pixel A and the sub-pixel B are neighboring to each other between the sub-pixels for the same viewpoint and the electrode angles thereof are different from each other. In FIG. 21A, all the sub-pixels are in the relation described above. With this structure, the sub-pixel A and the sub-pixel B are mutually recognized at the same viewpoint and the major axes and the minor axes of the refractive index ellipsoids are viewed simultaneously. Therefore, a fine stereoscopic display property can be acquired.

Fifth Exemplary Embodiment (Example 2)

Figure 23A:
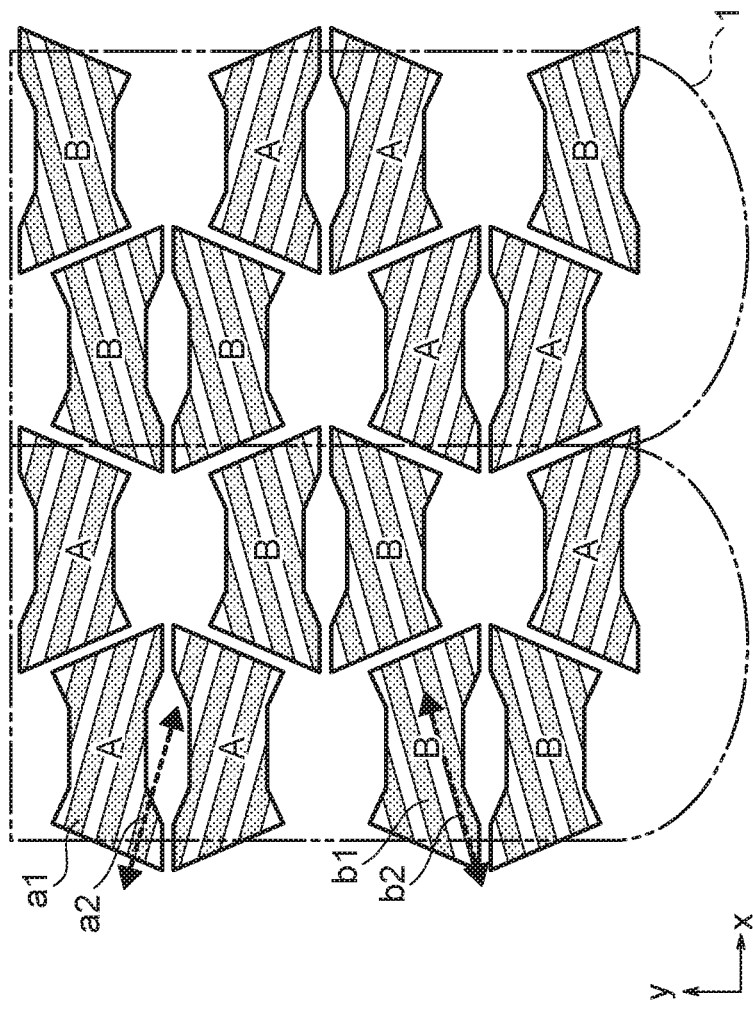
FIG. 23A is a fragmentary elevational view showing the structure of Example 2 of the fifth exemplary embodiment.
Figure 23B:
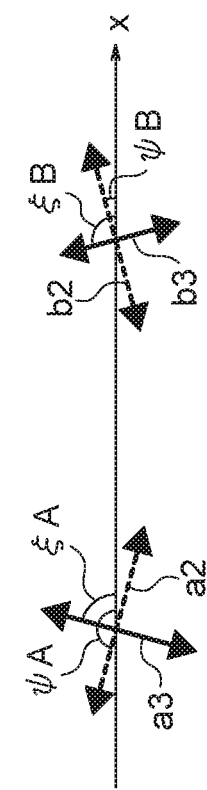
FIG. 23B is a schematic chart showing initial alignment directions of liquid crystal in sub-pixels of FIG. 23A, the electrode long-side directions, and the electric field directions.

Example 2 of the fifth exemplary embodiment will be described by referring to FIG. 23A and FIG. 23B. Example 2 is different from Example 1 of the fifth exemplary embodiment, and the aperture shape of the sub-pixels A and B is the same as that of the first exemplary embodiment (Example 1). Even when each of the aperture shapes of the first and second exemplary embodiments are used, it is possible with Example 2 to acquire a fine display property as in the case of Example 1 of the fifth exemplary embodiment.

Fifth Exemplary Embodiment (Example 3)

"The first direction (lateral direction of the drawings)" and "the second direction (vertical direction of the drawings) in Examples 3 to 5 of the fifth exemplary embodiment correspond to "the first direction x" and "the second direction y" of the other drawings. FIG. 24A, FIG. 24B, and FIG. 24C are tables showing the structural examples of Example 3. In Example 3, the same-viewpoint sub-pixels neighboring to each other in the first direction are two kinds of sub-pixels having different electrode angles from each other. FIG. 24A and FIG. 24B show the layout of the sub-pixels A and the sub-pixels B of a matrix of the sub-pixels in a case of 2-viewpoints, respectively. Specifically, the pixels of the most left end are a pixel column for the right-viewpoint, and the neighboring pixels on the right are a pixel column for the left-viewpoint. Such columns are repeated thereafter to form a sub-pixel matrix. Looking at the right-viewpoint pixel columns, the layout of the neighboring sub-pixels is changed alternately between the column of the sub-pixels A and the column of the sub-pixels B. Looking at the second direction, the sub-pixel A and the sub-pixel B are not changed with each other. With this structure, the same-viewpoint sub-pixels neighboring to each other in the first direction have different electrode angles form each other. Thus, the major axes and the minor axes of the refractive index ellipsoids are to be simultaneously viewed at any viewing field angles after transmitted through the light-ray control module.

FIG. 24C shows the layout of the sub-pixels A and the sub-pixels B of a matrix of the sub-pixels in a case of a stereoscopic display device of N-viewpoints. Note here that N is an integer of 2 or larger. Looking at a sub-pixel column for 1-viewpoint, the sub-pixel column of the most left end are all sub-pixels A, and a neighboring sub-pixel column for 1-viewpoint are all sub-pixels B. Thereafter, the neighboring sub-pixel columns for 1-viewpoint are alternately changed between the sub-pixels A and the sub-pixels B. The sub-pixel columns for other viewpoints are also changed alternately between the neighboring sub-pixel columns. Looking at the second direction, the sub-pixels are not changed with each other. However, even in the cases of N-viewpoints, it is also possible to change the sub-pixels alternately as in FIG. 21A or FIG. 23A.

Fifth Exemplary Embodiment (Example 4)

FIG. 25A and FIG. 25B are tables showing the structural examples of Example 4. In Example 4, the same-viewpoint sub-pixels neighboring to each other in the first direction are two kinds of sub-pixels having different electrode angles from each other. Further, the two kinds of sub-pixels are arranged in a cycle of one sub-pixel or two sub-pixels in the second direction. FIG. 25A and FIG. 25B show the layout of the sub-pixels A and the sub-pixels B of a matrix of the sub-pixels in a case of 2-viewpoints, respectively. The same-viewpoint sub-pixels neighboring to each other in the first direction are in the same structure of the sub-pixel layout described in Examples 1 and 2 of the fifth exemplary embodiment. In FIG. 25A, the sub-pixel A and the sub-pixel B are changed alternately by every sub-pixel in the second direction. Further, in FIG. 25B, the sub-pixel A and the sub-pixel B are changed alternately by every two sub-pixels in the second direction. FIG. 25B shows the structure same as the pixel layout shown in FIG. 21A or FIG. 23.

Compared to the structures of FIG. 24A and FIG. 24B, the sub-pixels A and the sub-pixel B are changed also in the second direction in the structures of FIG. 25A and FIG. 25B. Thus, the major axes and the minor axes of the refractive index ellipsoids are also viewed between the sub-pixels disposed in the second direction. Therefore, a still finer stereoscopic display property can be acquired.

Fifth Exemplary Embodiment (Example 5)

FIG. 26A and FIG. 26B are tables showing the structural examples of Example 5. In Example 5, the same-viewpoint and same-color sub-pixels neighboring to each other in the first direction are two kinds of sub-pixels having different electrode angles from each other. FIG. 26A and FIG. 26B show the layout of the sub-pixels A and the sub-pixels B of a matrix of the sub-pixels in a case of 2-viewpoints, and each of the sub-pixels has a color display function which shows one of three colors, red (R), green (G), and blue (B). In FIG. 26A, each color is in a vertical strip layout. In FIG. 26B, each color is in a lateral stripe layout.

The sub-pixel column of the most left end of FIG. 26A is a sub-pixel column for the right-viewpoint and for displaying red, and the sub-pixel A therein is changed to the sub-pixel B alternately in the second direction. Further, in the sub-pixel column for the right-viewpoint and for displaying red same as that sub-pixel column neighboring thereto in the first direction, the sub-pixel A (sub-pixel B) is changed to the sub-pixel B (sub-pixel A) in the first direction. Thereafter, in the sub-pixel column for the right-viewpoint and for displaying red same as that sub-pixel column neighboring thereto in the first direction, the sub-pixel A and the sub-pixel B are changed alternately in the first direction. In the columns of other viewpoints and other colors, the sub-pixel A and the sub-pixel B are alternately changed in the first direction in the same-viewpoint and same-color sub-pixel columns neighboring to each other in the first direction.

In the meantime, in FIG. 26B, the sub-pixel column of the most left end is a sub-pixel column for the right-viewpoint. The sub-pixels on n-th row are the sub-pixels for displaying red, and the sub-pixels on the (n+1)-th row are the sub-pixels for displaying green. Thereafter, the three colors are changed in the second direction from blue→red, ---. Note here that n is a natural number. The sub-pixel column for right-viewpoint neighboring to the sub-pixel column of the most left end in the first direction, the sub-pixels A are changed to sub-pixels B on the n-th row (R), and the sub-pixels B are changed to the sub-pixels A on the (n+1)-th row (G). In the other rows thereafter, the sub-pixels A (sub-pixels B) are also changed to the sub-pixels B (sub-pixels A) in the same manner. Thus, in the structure of FIG. 26B, the sub-pixel A and the sub-pixel B are alternately changed in the first direction in the same-viewpoint and same-color sub-pixel columns neighboring to each other in the first direction as in the case of FIG. 26A. The color display function of the sub-pixels is not limited to displaying three colors of red (R), green (G) and blue (B) but may be designed to display four or more colors (e.g., white (W) may be added to those three colors).

Each of Examples of the fifth exemplary embodiment are examples in which the present invention is embodied with a liquid crystal display device, and the Examples can be applied not only to the fifth exemplary embodiment but also to the other exemplary embodiments. Thus, each of Examples of the fifth exemplary embodiment is not limited only to the sub-pixel shape and the sub-pixel layout shown in FIG. 21A and FIG. 23A but may be combined arbitrarily with the sub-pixel shapes and the sub-pixel layout of the other exemplary embodiments. Other structures, operations, and effects of the fifth exemplary embodiment are same as those of the first to fourth exemplary embodiments.

A plurality of structural elements described in each of the above exemplary embodiments are not limited to those specifically described above. For example, in the explanations above, the light-ray control module is described as the structure using a lens. However, the light-ray control module is not limited to that. It is also possible to use an electro-optical element such as a liquid crystal lens or a parallax barrier. Furthermore, some of the structural elements shown in each of the exemplary embodiments can be omitted or the structural elements according to the different exemplary embodiments can be combined as appropriate.

A part of or a whole part of each of the above-described exemplary embodiments can be depicted as in following Supplementary Notes. However, it is to be noted that the present invention is not limited only to the following structures.

(Supplementary Note 1)

A stereoscopic display device, which includes:

a display panel including sub-pixels with optical aperture parts being disposed in a matrix form in a first direction and a second direction that is roughly perpendicular to the first direction; and a light-ray control module which is provided by opposing to the display panel for controlling light rays towards the first direction, wherein:

each of the aperture parts of two of the sub-pixels neighboring to each other in the first direction includes an overlapping region overlapping with each other in the second direction and an non-overlapping region not overlapping with each other;

provided that a width of the aperture part in the second direction is defined as a longitudinal aperture width, the non-overlapping region includes an aperture width fluctuating region where the longitudinal aperture width changes continuously from roughly a center of the aperture part towards both ends of the first direction, respectively; and a sum of the longitudinal aperture widths of the two overlapping regions overlapping with each other located at a same position in the first direction is larger than the longitudinal aperture width in roughly the center of the aperture part.

(Supplementary Note 2)

The stereoscopic display device as depicted in Supplementary Note 1, wherein the sum of the longitudinal aperture widths of the two overlapping regions overlapping with each other located at a same position in the first direction is same at any positions in the first direction.

(Supplementary Note 3)

The stereoscopic display device as depicted in Supplementary Note 1 or 2, wherein the sum of the longitudinal aperture widths of the two overlapping regions overlapping with each other located at a same position in the first direction is within a range that is over 1 time and equal to 1.12 times or less of the longitudinal aperture width in roughly the center of the aperture part.

(Supplementary Note 4)

The stereoscopic display device as depicted in any one of Supplementary Notes 1 to 3, wherein provided that peripheral sides of the aperture part are defined as aperture sides, all the aperture sides included in the aperture width fluctuating region are in parallel to none of the aperture sides included in the overlapping region.

(Supplementary Note 5)

The stereoscopic display device as depicted in any one of Supplementary Notes 1 to 4, wherein the non-overlapping region includes an aperture width constant region where the longitudinal aperture width is same at any positions in the first direction.

(Supplementary Note 6)

The stereoscopic display device as depicted in any one of Supplementary Notes 1 to 5, wherein provided that a maximum value of a difference between a position in the second direction at one end of the aperture part and a position in the second direction at other end of the aperture part is defined as a longitudinal aperture section, the longitudinal aperture section is larger than a maximum value of the longitudinal aperture width.

(Supplementary Note 7)

The stereoscopic display device as depicted in Supplementary Note 6, wherein the positions at the one end and the other end in the second direction forming the longitudinal aperture section are same between the aperture parts that are neighboring to each other in the first direction.

(Supplementary Note 8)

A stereoscopic display device, which includes:

a display panel including sub-pixels with optical aperture parts being disposed in a matrix form in a first direction and a second direction that is roughly perpendicular to the first direction; and a light-ray control module which is provided by opposing to the display panel for controlling light rays towards the first direction, wherein:

each of the aperture parts of two of the sub-pixels neighboring to each other in the first direction includes an overlapping region overlapping with each other in the second direction and an non-overlapping region not overlapping with each other;

provided that a width of the aperture part in the second direction is defined as a longitudinal aperture width, the overlapping region includes two longitudinal aperture width sum fluctuating regions where a sum of the longitudinal aperture widths of the two neighboring sub-pixels at a same position in the first direction changes continuously from roughly a center of the overlapping region towards both ends of the first direction, respectively; and a sum of the longitudinal aperture widths of the overlapping region is larger than the longitudinal aperture width in roughly the center of the aperture part.

(Supplementary Note 9)

The stereoscopic display device as depicted in Supplementary Note 1 or 8, wherein:

the sub-pixel is a lateral-field drive type liquid crystal display device;

striped electrodes are provided within the aperture part; and an angle formed between liquid crystal initial alignment and a long-side direction of the electrode of the sub-pixel is different from an angle formed between the liquid crystal initial alignment and a long-side direction of the electrode of the sub-pixel which is for a same viewpoint with that sub-pixel and neighboring thereto in the first direction.

INDUSTRIAL APPLICABILITY

The present invention can be utilized to any types of stereoscopic display devices as long as the devices provide stereoscopic images to naked-eye observers, such as a liquid crystal display, an organic EL display, a plasma display, and the like.

What is claimed is:

1. A stereoscopic display device, comprising:
a display panel including sub-pixels with optical aperture parts being disposed in a matrix form in a first direction and a second direction that is perpendicular to the first direction; and
a light-ray control module which is provided to the display panel for controlling light rays towards the first direction, wherein:
provided that two of the sub-pixels neighboring to each other in the first direction are defined as a first sub-pixel and a second sub-pixel respectively, each of the aperture parts of the first sub-pixel and the second sub-pixel includes an overlapping region where the first sub-pixel and the second sub-pixel overlap with each other in the second direction and a non-overlapping region where the first sub-pixel and the second sub-pixel do not overlap with each other;
wherein a width of the aperture part provided in the second direction is defined as a longitudinal aperture width, the non-overlapping region includes an aperture width fluctuating region where the longitudinal aperture width changes continuously from a center region of the aperture part to both ends of the non-overlapping region in the first direction, respectively and wherein the center region comprises an aperture width constant region where the longitudinal aperture width is same at any positions in the first direction; and
a sum of the longitudinal aperture widths of the overlapping regions of the first sub-pixel and the second sub-pixel located at a same position in the first direction is larger than the longitudinal aperture width in the aperture width constant region of the aperture part.

2. The stereoscopic display device as claimed in claim 1, wherein
the sum of the longitudinal aperture widths of the overlapping regions of the first sub-pixel and the second sub-pixel located at a same position in the first direction is same at any positions in the first direction.

3. The stereoscopic display device as claimed in claim 1, wherein
the sum of the longitudinal aperture widths of the overlapping regions of the first sub-pixel and the second sub-pixel located at a same position in the first direction is within a range that is over 1 time and equal to 1.12 times or less of the longitudinal aperture width in the aperture width constant region of the aperture part.

4. The stereoscopic display device as claimed in claim 1, wherein
peripheral sides of the aperture part are provided and are defined as aperture sides, all the aperture sides included in the aperture width fluctuating region are in parallel to none of the aperture sides included in the overlapping region.

5. The stereoscopic display device as claimed in claim 1, wherein
a maximum value of a difference between a position in the second direction at one end of the aperture part and a position in the second direction at another end of the aperture part is defined as a longitudinal aperture section, and the longitudinal aperture section is larger than a maximum value of the longitudinal aperture width.

6. The stereoscopic display device as claimed in claim 5, wherein
the positions at the one end and the other end in the second direction forming the longitudinal aperture section are same between the aperture parts that are neighboring to each other in the first direction.

7. The stereoscopic display device as claimed in claim 1, wherein:
the sub-pixel is a lateral-field drive type liquid crystal display device;
striped electrodes are provided within the aperture part; and
an angle formed between liquid crystal initial alignment and a long-side direction of the electrode of the sub-pixel is different from an angle formed between the liquid crystal initial alignment and a long-side direction of the electrode of the sub-pixel which is for a same viewpoint with that sub-pixel and neighboring thereto in the first direction.

* * * * *